United States Patent
Chang et al.

[11] Patent Number: 6,158,107
[45] Date of Patent: Dec. 12, 2000

[54] INVERTED MERGED MR HEAD WITH PLATED NOTCHED FIRST POLE TIP AND SELF-ALIGNED SECOND POLE TIP

[75] Inventors: Thomas Young Chang; Jyh-Shuey Jerry Lo, both of San Jose, Calif.

[73] Assignee: International Business Machines Corporation, Armonk, N.Y.

[21] Appl. No.: 09/054,055

[22] Filed: Apr. 2, 1998

[51] Int. Cl.[7] .......................... G11B 5/127; G11B 5/187
[52] U.S. Cl. ................... 29/603.14; 29/603.07; 29/603.15; 360/119
[58] Field of Search .................... 360/113, 119, 360/125, 126; 29/603.01, 603.07, 603.13, 603.14, 603.15, 603.16, 603.18; 216/22, 40, 41, 66, 79; 250/492.21, 492.3

[56] References Cited

U.S. PATENT DOCUMENTS

| | | | |
|---|---|---|---|
| 4,992,901 | 2/1991 | Keel et al. | 360/110 |
| 5,084,957 | 2/1992 | Amin et al. | 29/603 |
| 5,141,623 | 8/1992 | Cohen et al. | 205/122 |
| 5,285,340 | 2/1994 | Ju et al. | 360/119 |
| 5,438,747 | 8/1995 | Krounbi et al. | 29/603 |
| 5,578,342 | 11/1996 | Tran et al. | 427/131 |
| 5,640,753 | 6/1997 | Schultz et al. | 29/603.08 |
| 5,649,351 | 7/1997 | Cole et al. | 29/603.14 |
| 5,798,897 | 8/1998 | Chang et al. | 360/126 |
| 5,901,432 | 5/1999 | Armstrong et al. | 29/603.14 |
| 5,996,213 | 12/1999 | Shen et al. | 29/603.15 |

*Primary Examiner*—David L. Ometz
*Attorney, Agent, or Firm*—Gray Cary Ware & Freidenrich LLP; Ervin F. Johnston

[57] ABSTRACT

A method makes an inverted merged MR head with a second pole tip which is self-aligned with a top first pole tip. After forming a bottom first pole tip layer a top first pole tip is frame plated thereon with a width that defines a track width of the merged MR head. A photoresist layer, which is employed in the frame plating of the top first pole tip, is then soft baked which causes a photoresist opening above the top first pole tip to have sloping side edges which form a recess. An electrically-conductive sacrificial layer, such as copper, is then plated into the recess on top of the top first pole tip and the photoresist is removed. A forming layer, such as alumina, is then deposited and lapped so that the forming layer and the sacrificial layer have top surfaces that are flush with respect to one another. The sacrificial layer is then removed by an etchant that will not attack the materials of the pole tips and the forming layer. The forming layer now has a recess with sloping edges into which a gap layer, a seedlayer and a second pole tip layer are deposited. By this method the second pole tip is self-aligned with the top first pole tip with the second pole tip having a bottom that is substantially the same width as the top of the top first pole tip.

60 Claims, 31 Drawing Sheets

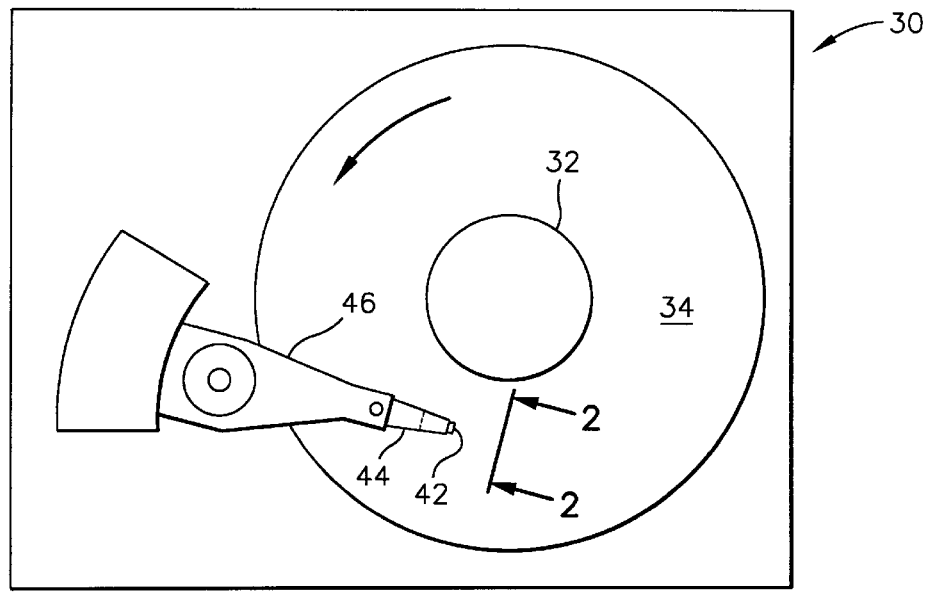
FIG. 1
FIG. 2
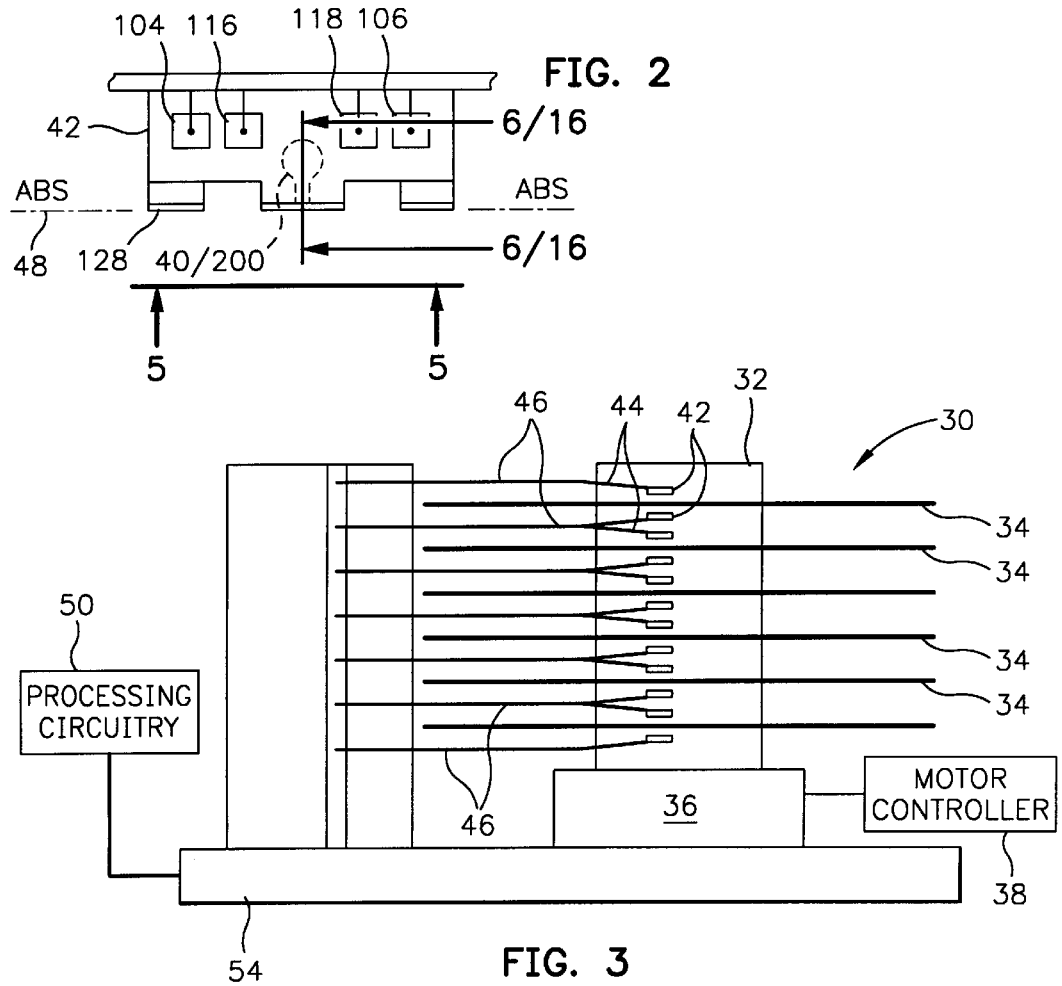
FIG. 3

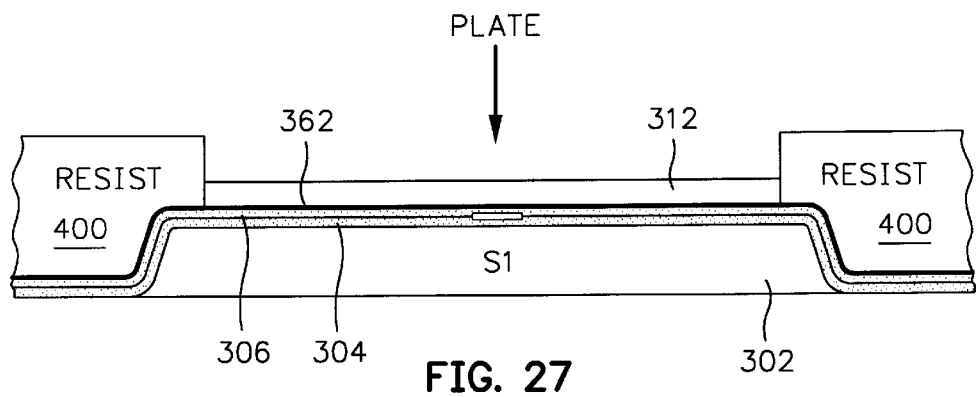
FIG. 27
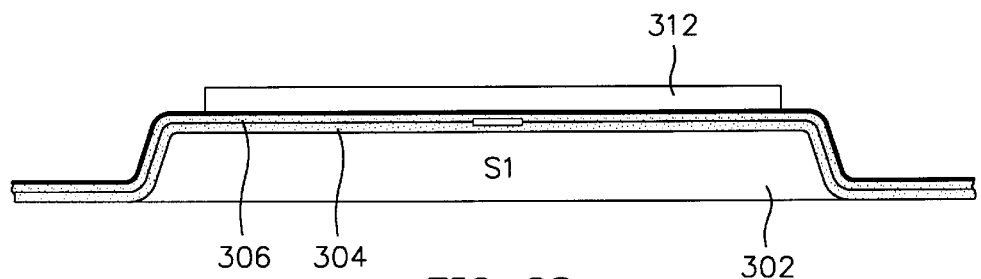
FIG. 28
FORM I1
FORM COIL
FORM I2
FIG. 29
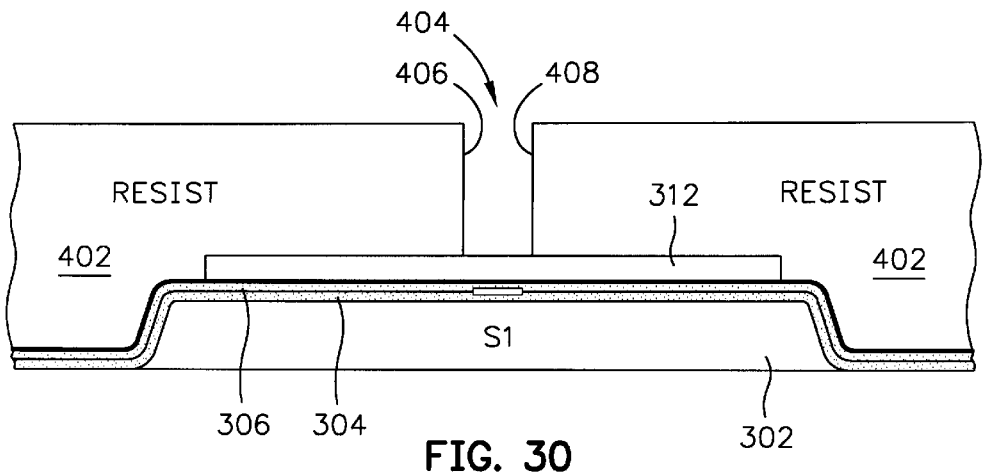
FIG. 30

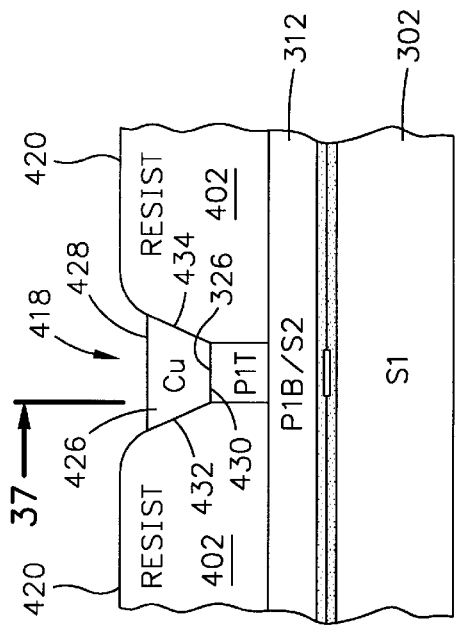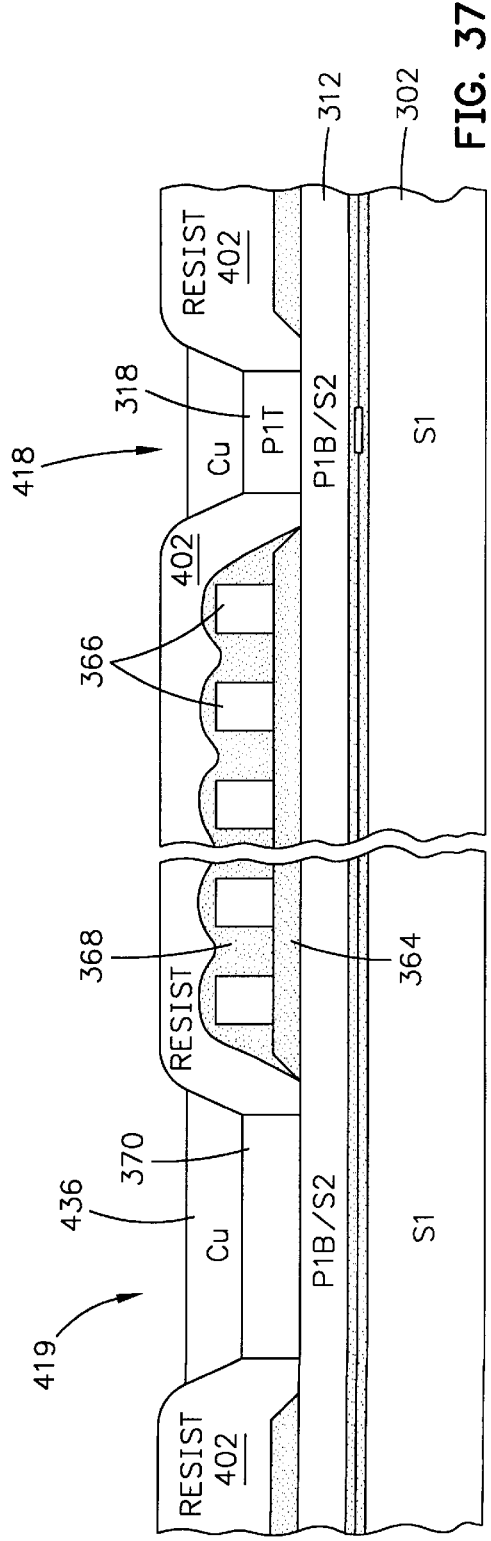

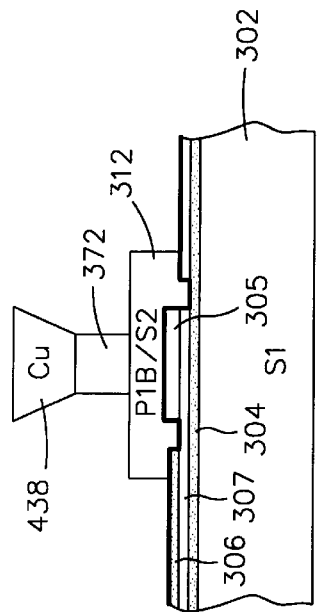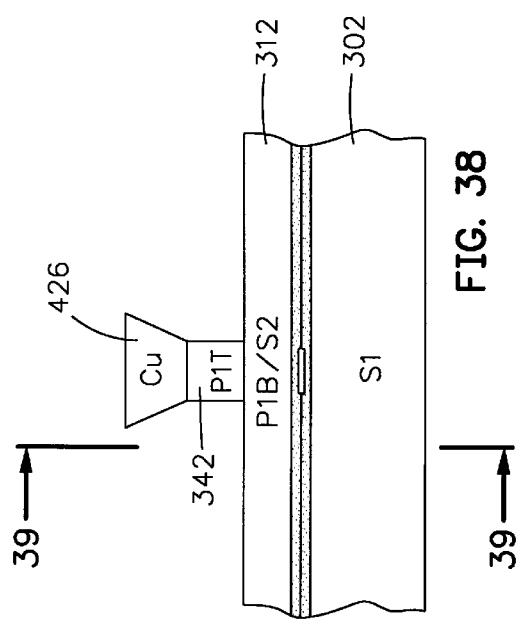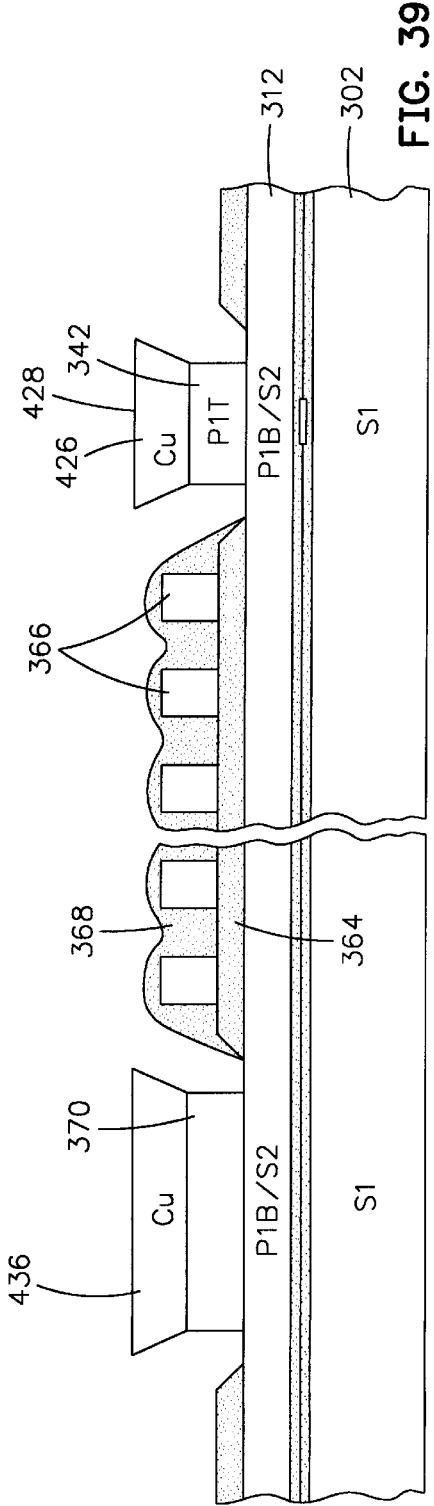

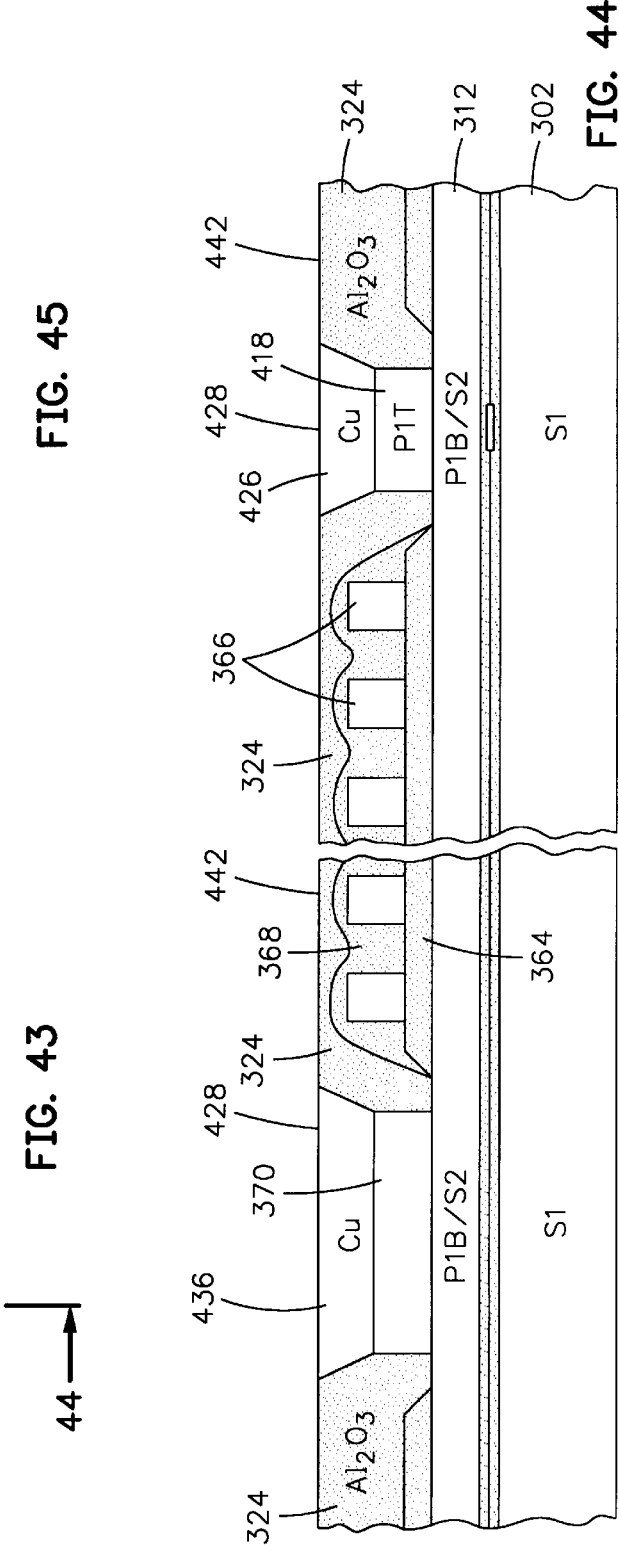
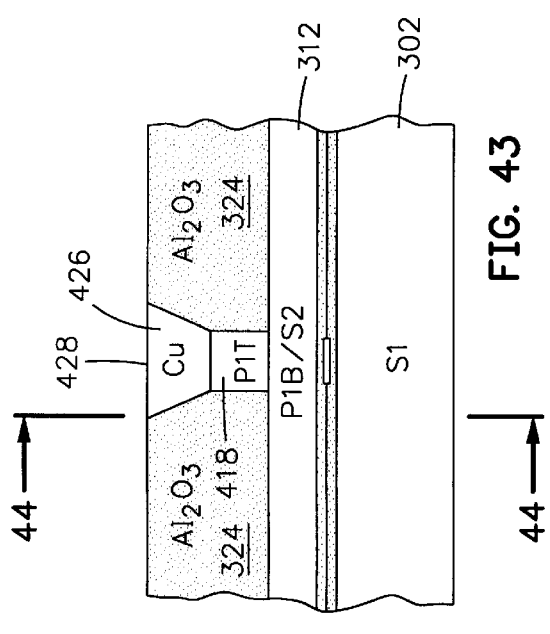

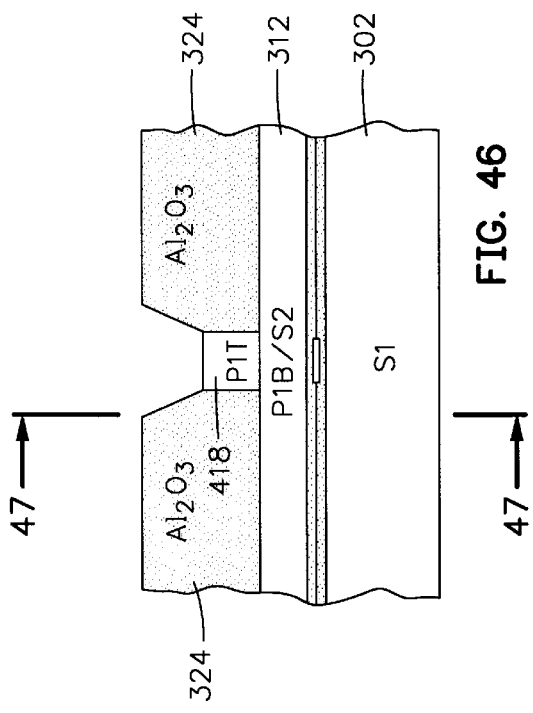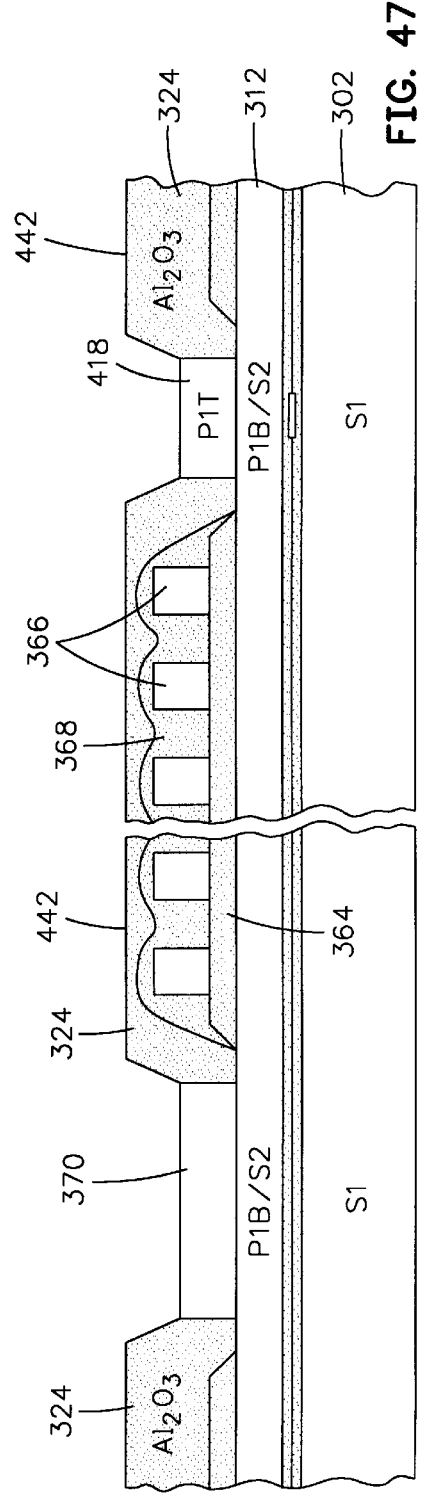

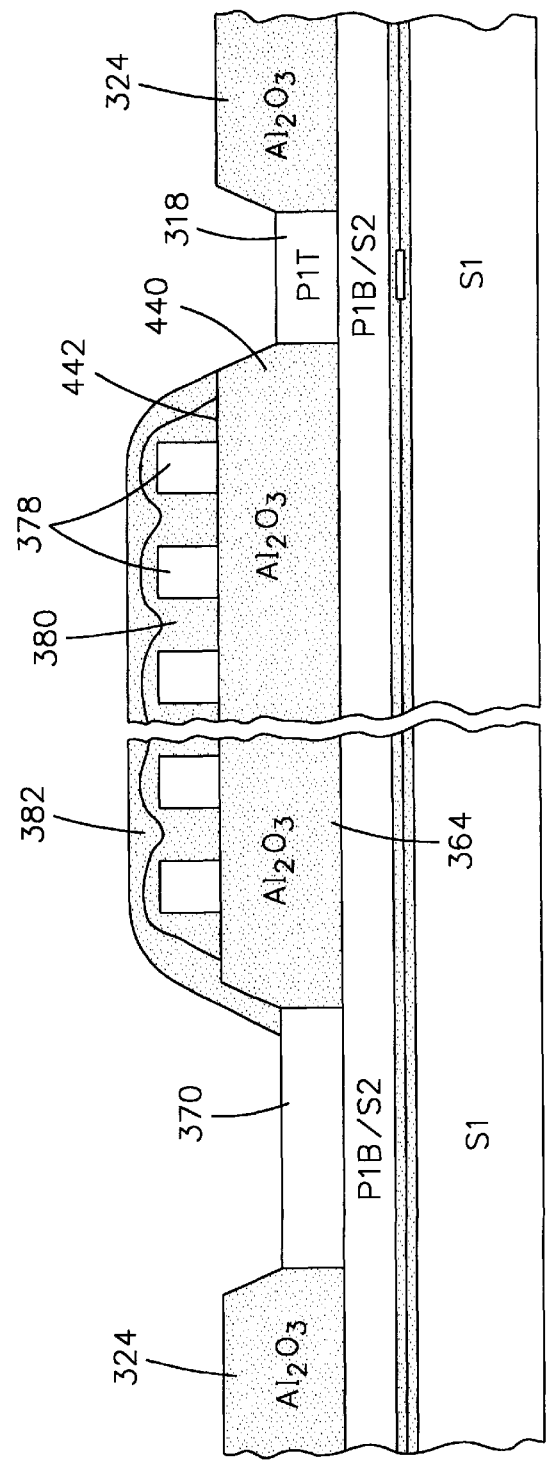

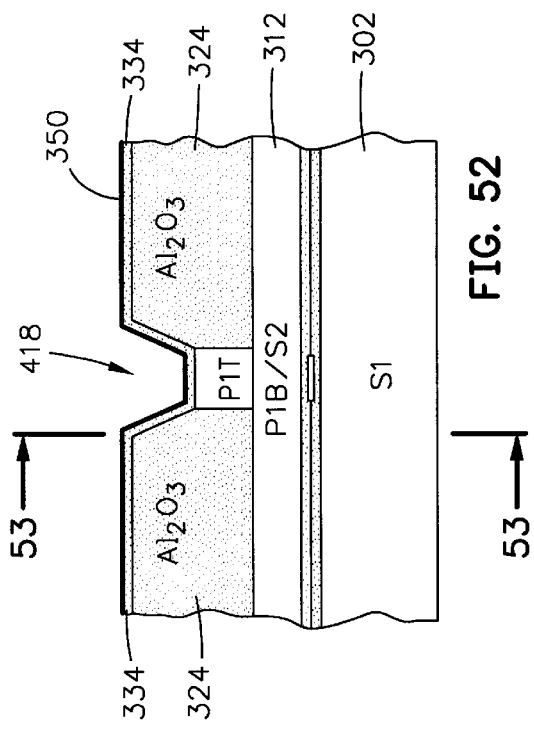
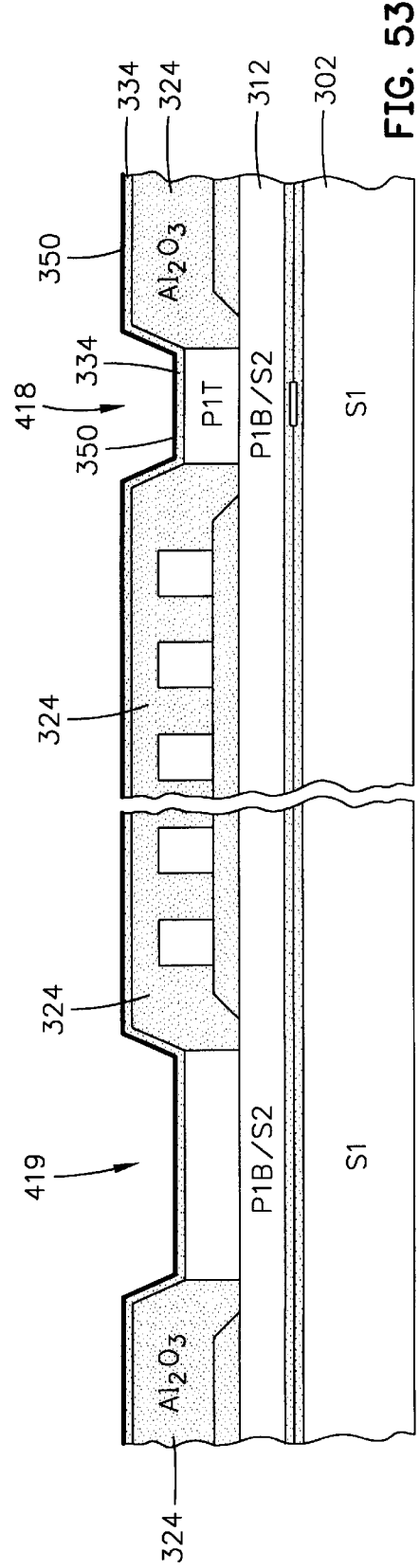

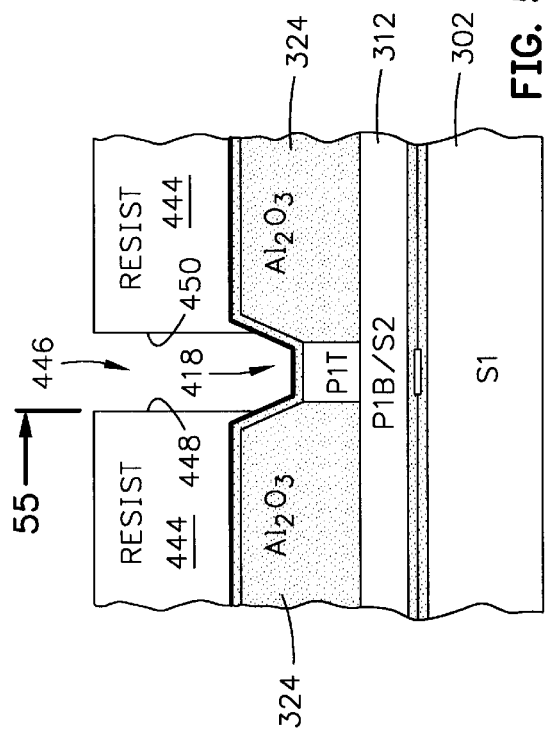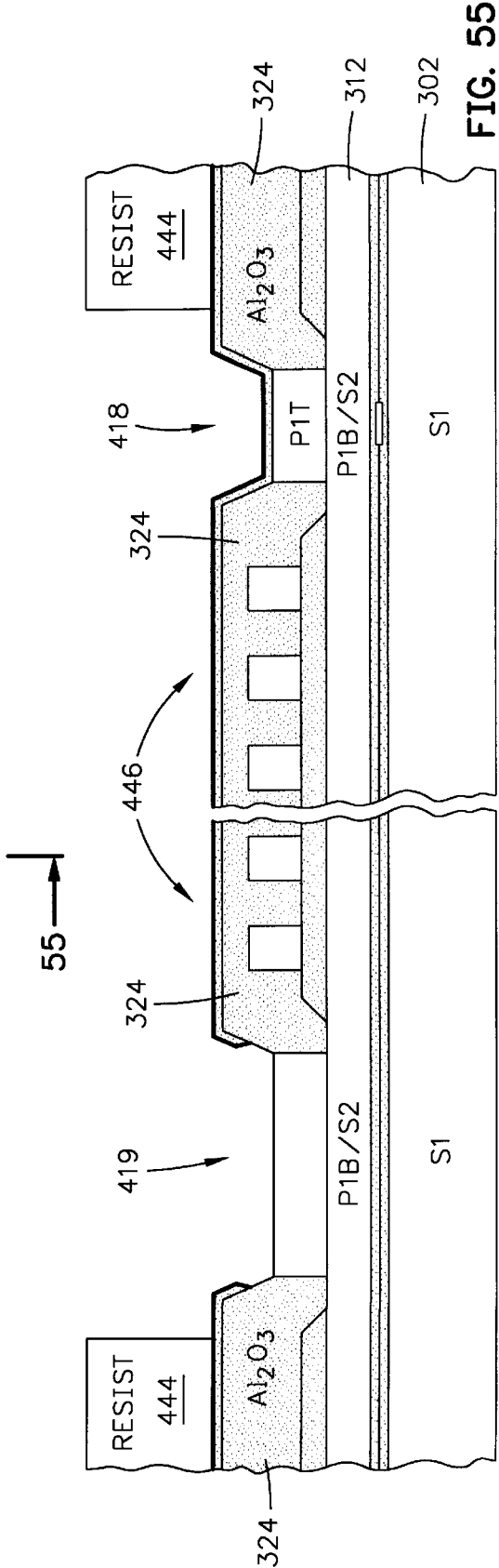

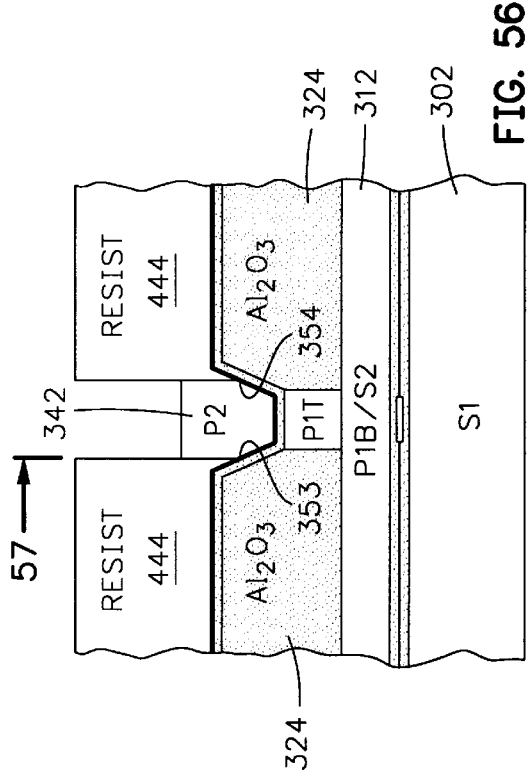
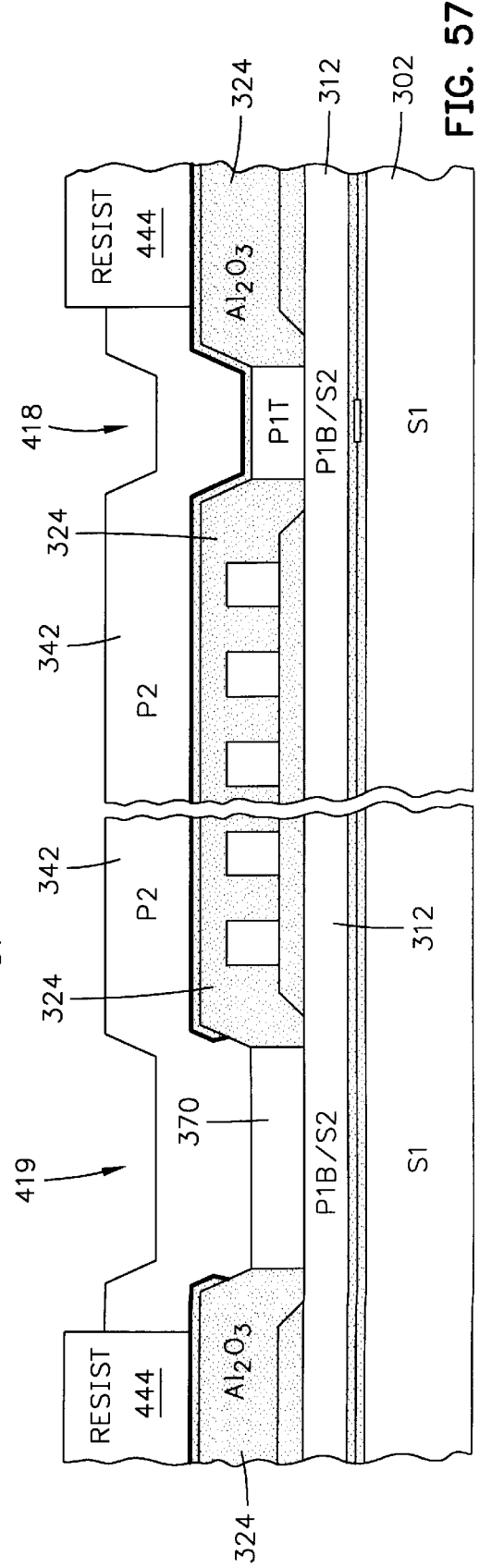

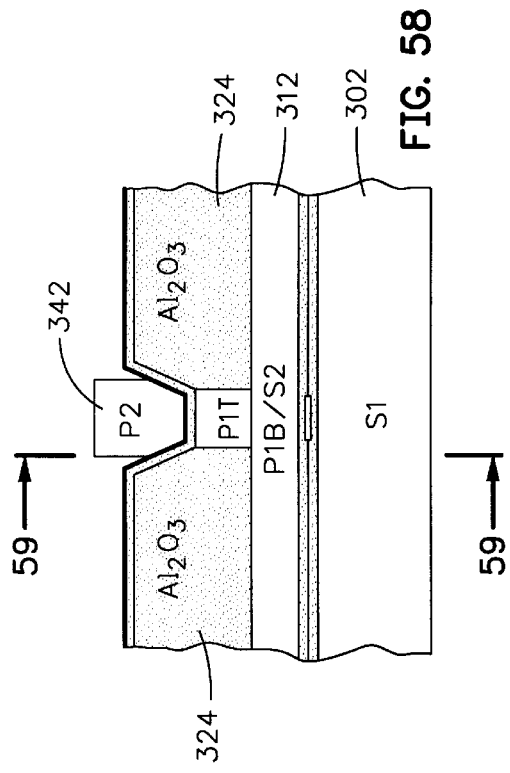
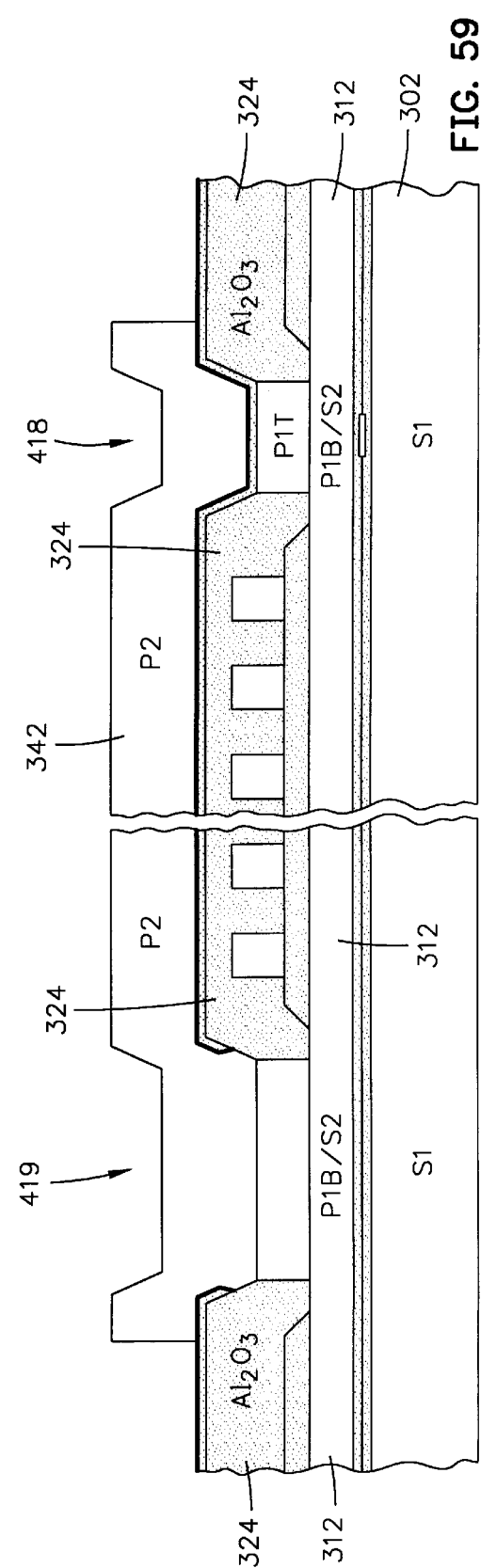

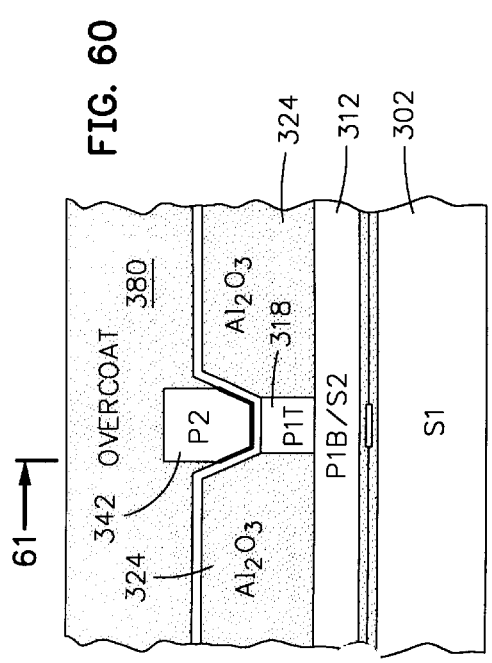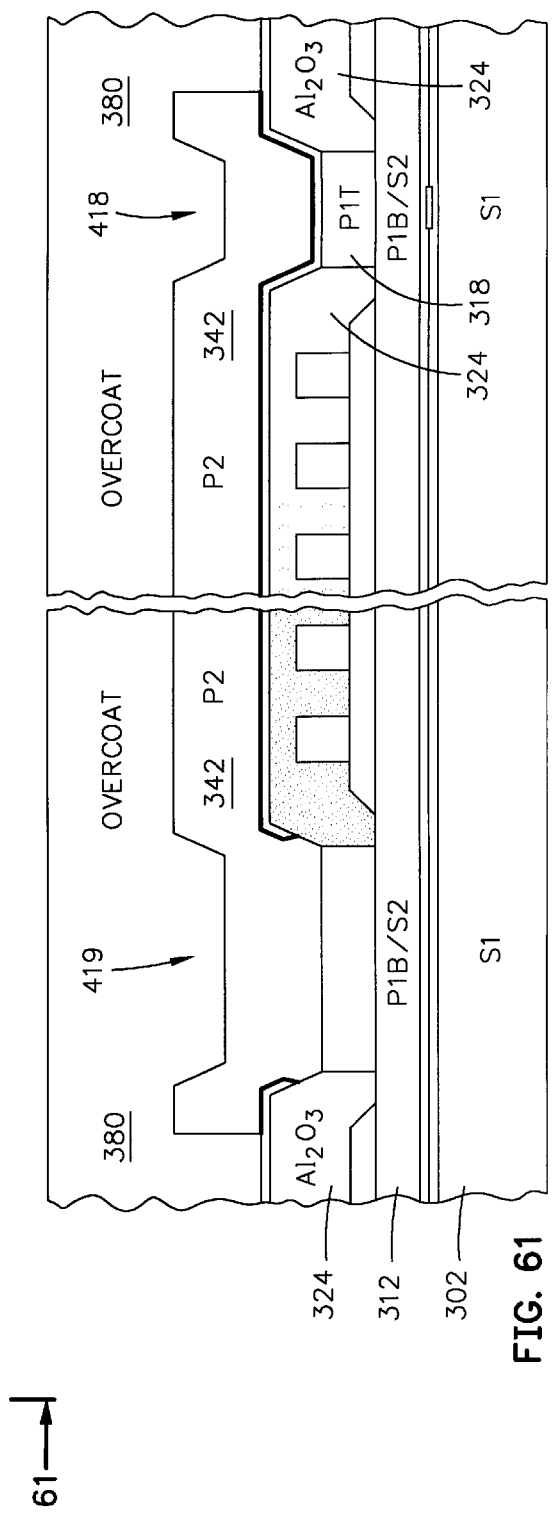

INVERTED MERGED MR HEAD WITH PLATED NOTCHED FIRST POLE TIP AND SELF-ALIGNED SECOND POLE TIP

BACKGROUND OF THE INVENTION

1. Field of the Invention

The present invention relates to an inverted merged magnetoresistive (MR) head with a plated notched first pole tip and a self-aligned second pole tip, and more particularly to an inverted merged MR head in which a top pole tip portion of a first pole piece is plated to form a notch and defines the track width of the head, and a second pole tip, which is notch-shaped, and confines flux transfer between the pole tips substantially within the defined track width.

2. Description of the Related Art

An inductive write head includes a coil layer embedded in first, second and third insulation layers (insulation stack), the insulation stack being located between first and second vole piece layers. A gap is formed between the first and second pole piece layers by a gap layer at an air bearing surface (ABS) of the write head. The pole piece layers are connected at a back gap. Currents are conducted through the coil layer, which produce magnetic fields in the pole pieces. The magnetic fields fringe across the gap at the ABS for the purpose of writing information in tracks on moving media, such as in circular tracks on a rotating magnetic disk or in longitudinal tracks on a moving magnetic tape.

The second pole piece layer has a pole tip portion which extends from the ABS to a flare point, and a yoke portion which extends from the flare point to the back gap. The flare point is where the second pole piece begins to widen (flare) to form the yoke. The placement of the flare point directly affects the magnitude of the magnetic field produced to write information on the recording medium. Since magnetic flux decays as it travels down the length of the narrow second pole tip, shortening the second pole tip will increase the magnitude of the flux reaching the recording media. Therefore, performance can be optimized by aggressively placing the flare point close to the ABS.

Another parameter important in the design of an inductive write head is the location of the zero throat height (ZTH). The zero throat height is the location where the first and second pole pieces first separate from one another after the ABS. Such separation is imposed by an insulation layer, typically the first insulation layer in the insulation stack. Flux leakage between the first and second pole pieces is minimized by locating the ZTH as close as possible to the ABS.

Unfortunately, the aforementioned design parameters require a tradeoff in the fabrication of the second pole tip. The second pole tip should be well-defined in order to write well-defined tracks on the rotating disk. Poor definition of the second pole tip may result in overwriting of adjacent tracks. A well-defined second pole tip should have parallel planar side walls which are perpendicular to the ABS. A sharp perpendicular definition of the side walls is difficult to achieve because the second pole tip is typically formed along with the yoke after the formation of the first insulation layer, the coil layer and the second and third insulation layers. Each insulation layer includes a hard-baked photoresist having a sloping front surface. After construction, the first, second and third insulation layers present front sloping surfaces which face the ABS. The ZTH defining insulation layer rises from a plane normal to the ABS at an angle (apex angle) to the plane. After hard baking of the insulation layers and deposition of a metallic seedlayer, the sloping surfaces of the insulation layers exhibit a high optical reflectivity. When the second pole tip and yoke are constructed, a thick layer of photoresist is spun on top of the insulation layers and photo-patterned to shape the second pole tip, using a conventional photolithography technique. In the photolithography step, ultraviolet light is directed vertically through slits in an opaque mask, exposing areas of the photoresist which are to be removed by a subsequent development step. One of the areas to be removed is the area where the second pole piece (pole tip and yoke) is to be formed by plating. Unfortunately, when ultraviolet light strikes the sloping surfaces of the insulation layers in a flaring region of the second pole piece, the ultraviolet light is reflected forward, toward the ABS, into photoresist areas at the sides of the second pole tip region. After development, the side walls of the photoresist extend outwardly from the intended ultraviolet pattern, causing the pole tip plated therein to be poorly formed. This is called "reflective notching". As stated, this causes overwriting of adjacent tracks on a rotating disk. It should be evident that, if the flare point is recessed far enough into the head, the effect of reflective notching would be reduced or eliminated since it would occur behind the sloping surfaces. However, this solution produces a long second pole tip which quickly reduces the magnitude of flux reaching the recording medium.

The high profile of the insulation stack causes another problem after the photoresist is spun on a wafer When the photoresist is spun on a wafer, it is substantially planarized across the wafer. The thickness of the resist in the second pole tip region is higher than other regions of the head since the second pole tip is substantially lower on the wafer than the yoke portion of the second pole piece. During the light exposure step, the light progressively scatters in the deep photoresist like light in a body of water, causing poor resolution during the light exposure step.

A scheme for minimizing the reflective notching and resolution problems is to construct the second pole piece with bottom and top second pole tips. The bottom second pole tip is constructed before the insulation layers to eliminate the reflective notching problem. After forming the first pole piece layer and the write gap layer, a photoresist layer is spun on the partially completed head. Ultraviolet light from the photo-patterning step is not reflected forward since the photoresist layer does not cover an insulation stack. Further, the photoresist is significantly thinner in the pole tip region so that significantly less light scattering takes place. After plating the bottom second pole tip, the photoresist layer is removed and the first insulation layer, the coil layer, and the second and third insulation layers are formed. After the top second pole tip is stitched (connected) to the bottom second pole tip, it extends from the ABS to the back gap. Since the bottom second pole tip is well-formed, well-formed notches can be made in the first pole piece, as discussed hereinafter. However, with this scheme, the ZTH is dependent upon the location of the recessed end of the bottom second pole tip. Since the bottom second pole tip has to be long enough to provide a sufficient stitching area, this length may result in undesirable flux leakage between the first and second pole pieces. Since the top second pole tip is typically wider than the bottom second pole tip, the second pole piece has a T-shape at the ABS. The upright portion of the T is the front edge of the bottom second pole tip, and the cross of the T is the front edge of the top second pole tip. A problem with this configuration is that, during operation, flux fringes from the outer corners of the top second pole tip to a much wider first pole piece at the ABS, causing adjacent tracks to be overwritten.

Once the bottom second pole tip is formed, it is desirable to notch the first pole tip of the first pole piece opposite the first and second corners at the base of the bottom second pole tip so that flux transfer between the pole tips does not stray beyond the track width defined by the bottom second pole tip. Notching provides the first pole piece with a track width that substantially matches the track width of the bottom second pole tip. A prior art process for notching the first pole piece entails milling the gap layer and the first pole piece with an ion beam, employing the bottom second pole tip as a mask. The gap layer is typically alumina and the first and second pole pieces and pole tips are typically Permalloy (NiFe). The alumina mills more slowly than the Permalloy; thus the top of the bottom second pole tip and a top surface of the first pole piece are milled more quickly than the gap layer. Further, during ion milling, a substantial amount of alumina is redeposited on surfaces of the workpiece. (Redeposited alumina is referred to as "redep"). In order to minimize redep, the milling ion beam is typically directed at an angle to a normal through the layers, which performs milling and cleanup simultaneously. The gap layer in the field remote from the first and second corners of the bottom second pole tip is the first to be milled because of a shadowing effect at the first and second corners caused by the bottom second pole tip when the ion beam is angled. In this case, the ion beam will overmill the first pole piece before the gap layer is removed adjacent the first and second corners of the bottom second pole tip in the region where the notching is to take place. After the gap layer is removed above the sites where the notching is to take place, ion milling continues in order to notch the first pole piece. Overmilling of the first pole piece continues to take place in the field beyond the notches, thereby forming surfaces of the first pole piece that slope downwardly from the notches. As is known, such overmilling of the first pole piece can expose leads to the MR sensor, thereby rendering the head inoperative.

Even if overmilling of the first pole piece can be controlled, there is potentially a more troublesome problem, namely overmilling the top of the bottom second pole tip when the unwanted portions of the gap layer are milled and notches are formed. In order to compensate for this overmilling, the aspect ratio (ratio of thickness of photoresist to track width of the bottom second pole tip) is increased so that a top portion of the top of the bottom second pole tip can be sacrificed during the milling steps. When the aspect ratio is increased, definition of the bottom second pole tip is degraded because of the thickness of the photoresist, discussed hereinabove, resulting in track overwriting.

Another problem with the prior art merged MR head is that the profile of the MR sensor between the first and second gap layers is replicated through the second shield/first pole piece layer to the write gap layer causing the write gap layer to have the shape of a slightly concave curve oriented toward the MR sensor. As a result, when the write head portion of the merged MR head writes data, the footprint of the written data is slightly curved on the written track. When a straight MR sensor reads this curved data in a data track, there is progressive signal loss from the center of the data track toward the outer extremities of the data track.

Accordingly, there is a strong-felt need to provide an inductive write head portion of a merged MR head wherein a track width defining pole tip can be formed without reflective notching or a curved write gap.

SUMMARY OF THE INVENTION

In this invention, the aforementioned reflective notching problem is eliminated by a merged MR head that has an inverted write head. The first pole piece has first and second layers that terminate as bottom and top first pole tips, respectively, at the ABS, and the second pole piece typically has a single second pole piece layer that terminates as a second pole tip at the ABS. The top first pole tip is located between the bottom first pole tip and the second pole tip. Each of the bottom and top first pole tips and the second pole tip has an exposed edge at the ABS that has a width. The inverted write head differs from the prior art write head in that the width of the exposed edge of the top first pole tip at the ABS defines a track width instead of the second pole tip. This width is less than the width of the exposed edge of the bottom first pole tip.

Since the top first pole tip defines the track width, the reflective notching problem is overcome. The first and second layers of the first pole piece are constructed before the insulation stack, thereby obviating light reflection into the pole tip region. The first layer of the first pole piece is a flat layer. The second layer of the first pole piece is also a flat layer and is constructed on the first layer. Accordingly, a thinner photoresist mask can be provided for patterning each of these layers, resulting in improved resolution. Since the second pole piece layer is constructed subsequent to the insulation stack, light will be reflected into the pole tip region of the second pole piece layer during its construction. This is not a problem, however, since the second pole tip does not define the track width of the write head in an inverted head.

With the present method of making of the second pole tip, the inverted MR head has a wide edge at the ABS, as compared to the edge of the top first pole tip, but is narrower than the edge of the bottom first pole tip An ABS view of the edges of the bottom and top first pole tips resembles an inverted T. The present invention provides a method of making a novel inverted merged MR head wherein the second pole tip is made with a notch-like configuration, so that flux will be transferred between the top first and second pole tips substantially within the track width defined by the top first pole tip. Further, the second pole tip is configured to prevent side track erasure problems caused by flux leakage between the second pole tip and the wide expanse of the bottom first pole tip.

More specifically, the second pole tip is provided with a base that is substantially the same width as, and is aligned with, the top of the top first pole tip, and has tapered edges that slope upwardly from the base to vertical side edges. While the tapered edges of the second pole tip differ from the vertical edges of the prior art first pole piece, the performances are substantially the same. In the present invention, a narrow pedestal-type top first pole tip is located on a wide bottom first pole tip and the second pole tip is directly above and aligned with the top first pole tip. A gap layer separates the top of the top first pole tip from the base of the second pole tip and is uniquely shaped with a tapered recess that is filled with the second pole tip.

According to this invention, the bottom first pole tip is formed with a width W1 at the ABS. The top first pole tip is formed on the bottom first pole tip with a width W2 at the ABS. The width W2 is less than the width W1 and defines the track width of the write head. A photoresist layer is then spun on a top surface of the bottom first pole tip. The photoresist layer is exposed and then developed to provide an opening that exposes a portion of the top surface of the bottom first pole tip where a top first pole tip is to be constructed. The top first pole tip is then plated in the opening on the top surface portion of the bottom first pole tip leaving a remainder opening portion in the photoresist layer that reaches to a top surface of the second component so that the top surface of the top first pole tip is below the top surface of the photoresist layer. The photoresist layer is then soft baked at 110°–140° C. until the remainder opening portion in the photoresist layer has sloping side walls that diverge as they extend upwardly. A sacrificial layer is then plated in the remainder opening portion on an exposed top surface of the top first pole tip with a top surface and sloping side walls that engage the sloping side walls of the remainder opening portion in the photoresist layer. The photoresist layer is then removed leaving the top first pole tip and the sacrificial layer standing free. A forming layer with a top surface is then formed on other portions of the top surface of the bottom first pole tip adjacent the side walls of the top first pole tip and the side walls of the sacrificial layer. The top surfaces of the forming layer and the sacrificial layer are then lapped until they are substantially flush with one another. The sacrificial layer is then removed, leaving forming layers with a remainder opening portion exposing the top surface of the top first pole tip. A write gap layer is then formed in the remainder opening portion on the exposed top surface of the top first pole tip. A second pole piece layer is then formed in the remainder opening portion of the forming layer on top of the write gap layer with sloping side walls that engage the sloping side walls of the remainder opening portion of the forming layer.

This method constructs a second pole tip that has a bottom tapered portion and a top rectangular portion. The bottom tapered portion has a flat bottom with a width that is substantially the same as the width (track width) of top first pole tip. The method allows great flexibility in constructing a desired depth of the tapered portion of the second pole tip. The greater the depth, the greater the angle at intermediate corners of the second pole tip where there is a potential for flux leakage from the second pole tip to the very wide bottom first pole tip. This depth is simply defined by the depth of the sacrificial layer. The width of the top of the tapered portion is preferably 1.5 to 4.0 times the width of its bottom flat portion.

This method leaves many options for constructing one or more write coil layers. One option is to construct a coil layer after constructing the bottom first pole tip. In this option a first insulation layer is deposited on a recessed portion of the layer that forms the bottom first pole tip, and the coil layer is deposited on the first insulation layer. A second insulation layer is then deposited on the coil layer. During subsequent steps, the forming layer provides a third insulation layer for the coil layer. A second option is to construct a second coil on top of the forming layer after it is lapped, followed by second and third insulation layers for the second coil. A third option is to omit constructing a coil on the bottom first pole tip layer and construct a single coil on the forming layer after it is lapped.

Another advantage of the method is that portions of the studs for the read and write terminals can be constructed simultaneously with the steps of constructing the top first pole tip and the sacrificial layer. The studs extend vertically to interconnect the horizontal leads from the write coil and the MR sensor to the read and write terminals that are exposed to the outside world. When the top first pole tip is constructed, the same deposition is employed for depositing stud portions at the stud sites, when the sacrificial layer is deposited, the same deposition is employed for depositing additional stud portions at the stud sites. In contrast to constructing the pole tips, the sacrificial layer portions at the stud sites are not removed when the sacrificial layer is removed at the pole tip site.

Still another advantage of the method is that construction of the back gap, where the first and second pole pieces are connected together, is facilitated by depositing a layer portion of the top first pole tip and a layer portion of the sacrificial layer on the bottom first pole tip layer at the back gap site. The sacrificial layer portion at the back gap is removed with the sacrificial layer at the pole tip site, after which the second pole tip is deposited on the top first pole tip layer portion at the back gap to connect the first and second pole pieces. By depositing the sacrificial layer portion at the back gap site, an etching step for providing a via at the back gap site to connect the first and second pole pieces is eliminated.

It should be noted that the second pole tip is constructed after constructing the insulation stack and one or more coil layers. As stated hereinabove, this will cause reflective notching if the second pole piece layer is flared. Even though the second pole tip is notched by reflective notching, this will not affect the performance of the write head since the portion of the second pole tip immediately above the track width defining top first pole tip will be well formed by the method of this invention Reflective notching of the second pole tip beyond its well-formed tapered portion will not impede flux transfer between the pole tips. Further, even though a photoresist mask employed for making the second pole tip may not be aligned with the top first pole tip, the flux transferring portion of the second pole tip is aligned with the top first pole tip by the method of making.

Further, this method of making eliminates write head curvature. In the prior art head the profile of the MR sensor is replicated by the write gap because the layers are constructed on top of each other without planarization. In the present method the lapping step eliminates any curve replicated by the top first pole tip.

While a head is manufactured according to this invention is preferably a merged MR head, in which the second shield layer of the read head portion also serves as the bottom first pole tip of the write head portion, the invention may also be used to produce a piggyback head wherein the second shield layer and the bottom first pole tip are separate layers. Further, while the magnetic disk preferably rotates in a direction such that the second pole tip is the last pole tip to pass the written track, the invention also contemplates manufacture of a disk drive wherein the top first pole tip is last pole tip to pass the written track. Still further, a merged MR head made according to this invention may also include a spin valve read head.

An object of the present invention is to provide a method of making a combined magnetic inverted write and read head wherein the base of a second pole tip on the write head has substantially the same width as the width of the top first pole tips and is aligned therewith.

Another object is to provide a method of making an inverted merged MR head having a second pole tip that is self-aligned with a top first pole tip.

A further object is to provide a method of making an inverted merged MR head having the write gap layer that is not curved.

A still another object is to provide a method of making an inverted merged MR head in which a base of a second pole tip is substantially notched by sloping edges adjacent side edges of a top first pole tip, in order to confine flux transfer substantially within a track width defined by the top first pole tip.

A still further object of the present invention is to provide a combined magnetic inverted write and read head in which the base of a second pole tip has substantially the same width as a top first pole tip and is aligned therewith.

A still another object is to provide an inverted merged MR head having a second pole tip that is self-aligned with a top first pole tip.

A still further object is to provide an inverted merged MR head having a write gap layer that is straight, instead of being curved.

Still another object is to provide an inverted merged MR head in which a base of a second pole tip is substantially notched adjacent side walls of a top first pole tip in order to confine flux substantially within a track width defined by the top first pole tip.

Other objects and advantages of the invention will be more greatly appreciated upon reading the following description taken together with the accompanying drawings

BRIEF DESCRIPTION OF THE DRAWINGS

FIG. 1 is a planar view of an exemplary magnetic disk drive;

FIG. 2 is an end view of a slider with a magnetic head of the disk drive as seen in plane 2—2;

FIG. 3 is an elevation view of the magnetic disk drive wherein multiple disks and magnetic heads are employed;

FIG. 27 is the same as FIG. 26 except a top first pole tip layer has been formed by plating;

FIG. 28 is the same as FIG. 27 except the photoresist mask has been removed;

FIG. 29 is a block diagram showing optional construction of a first insulation layer, coil layer and second insulation layer;

FIG. 30 is the same as FIG. 28 except a second photoresist mask has been formed for forming a top first pole tip layer;

FIG. 36 is the same as FIG. 34 except a sacrificial layer has been deposited in the opening in the photoresist layer;

FIG. 37 is a view taken along plane 37—37 of FIG. 36;

FIG. 38 is the same as FIG. 36 except the photoresist layer has been removed;

FIG. 39 is a view taken along plane 39—39 of FIG. 38;

FIG. 40 is the same as FIG. 33 except a portion of the sacrificial layer has also been deposited at the stud site on top of the top first pole tip layer portion;

FIG. 43 is the same as FIG. 42 except the forming layer and a top portion of the sacrificial layer have been lapped flush with respect to one another;

FIG. 44 is a view taken along plane 44—44 of FIG. 43;

FIG. 45 is the same as FIG. 40 except the forming layer and the top portion of the sacrificial layer portion at the stud site have been lapped flush with respect to one another;

FIG. 46 is the same as FIG. 43 except the sacrificial layer portions at only the pole tip and back gap sites have been removed;

FIG. 47 is a view taken along plane 47—47 of FIG. 46;

FIG. 50 is a block diagram of an optional construction of a first write coil and second and third insulation layers on the forming layer;

FIG. 51 is the same as FIG. 47 with an optional construction of a single write coil layer and second and third insulation layers on the forming layer;

FIG. 52 is the same as FIG. 47 except a write gap layer and a seedlayer have been deposited;

FIG. 53 is a view taken along plane 53—53 of FIG. 52;

FIG. 54 is the same as FIG. 52 except a photoresist layer has been patterned thereon;

FIG. 55 is a view taken along plane 55—55 of FIG. 54;

FIG. 56 is the same as FIG. 54 except a second pole tip layer has been deposited;

FIG. 57 is a view taken along plane 57—57 of FIG. 56;

FIG. 58 is the same as FIG. 57 except the photoresist layer has been removed;

FIG. 59 is a view taken along plane 59—59 of FIG. 58;

FIG. 60 is the same as FIG. 58 except an overcoat layer has been deposited;

FIG. 61 is a view taken along plane 61—61 of FIG. 60;

DESCRIPTION OF THE PREFERRED EMBODIMENTS

Magnetic Disk Drive

Figure 4:
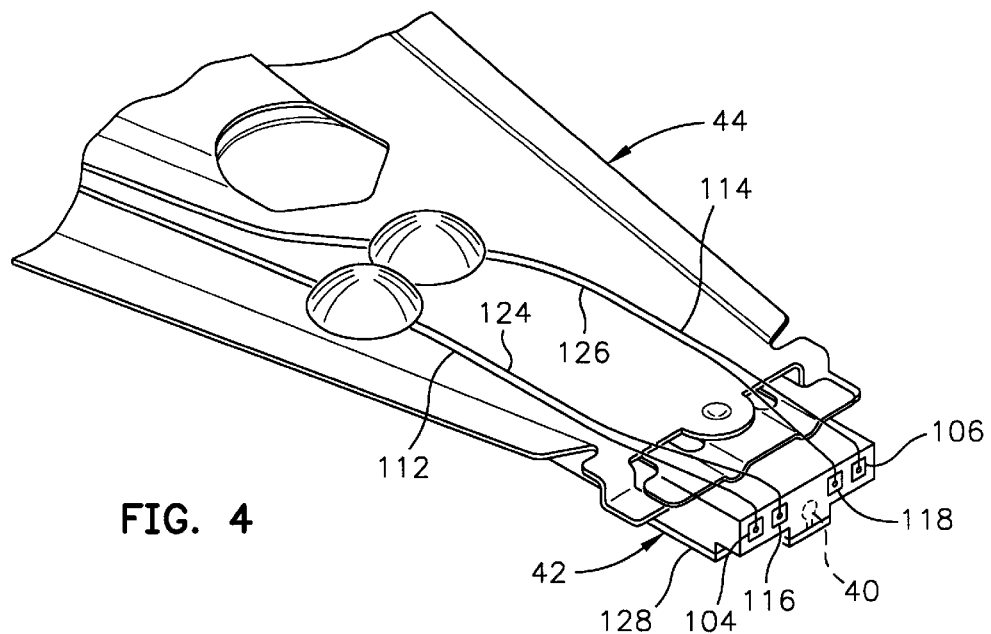
FIG. 4 is an isometric illustration of an exemplary suspension system for supporting the slider and magnetic head.
Figure 5:
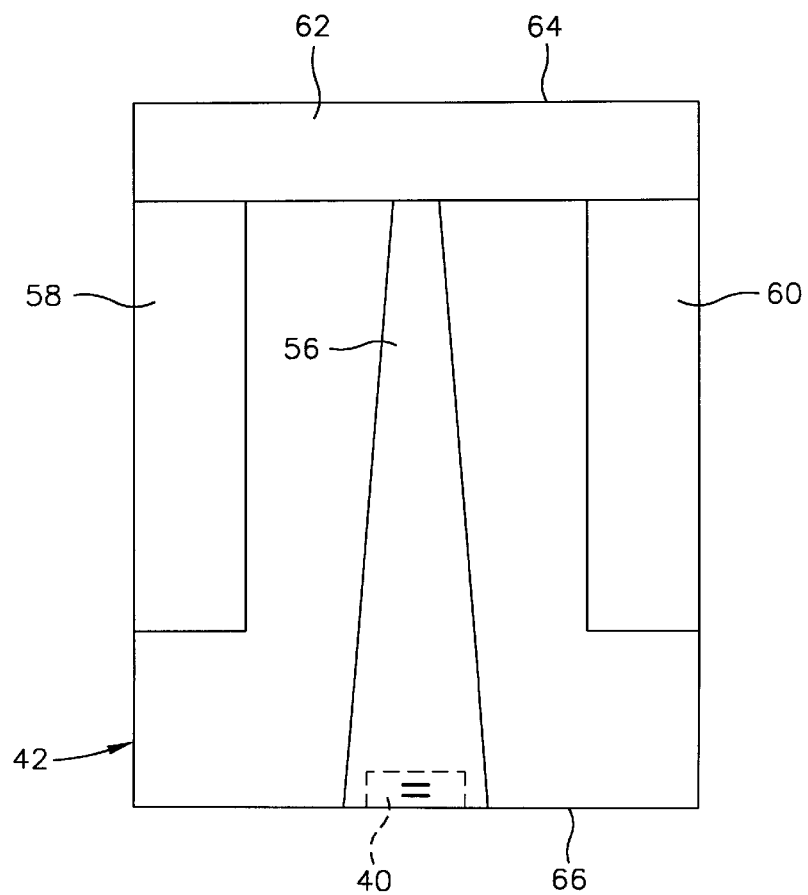
FIG. 5 is an ABS view of the magnetic head taken along plane 5—5 of FIG. 2.

Referring now to the drawings wherein like reference numerals designate like or similar parts throughout the several views, a magnetic disk drive 30 is illustrated in FIGS. 1–3. The drive 30 includes a spindle 32 that supports and rotates a magnetic disk 34. The spindle 32 is rotated by a motor 36 that is controlled by a motor controller 38. A combined read and write magnetic head 40 is mounted on a slider 42 that is supported by a suspension 44 and actuator arm 46. A plurality of disks, sliders and suspensions may be employed in a large capacity direct access storage device (DASD) as shown in FIG. 3. The suspension 44 and actuator arm 46 position the slider 42 so that the magnetic head 40 is in a transducing relationship with a surface of the magnetic disk 34. When the disk 34 is rotated by the motor 36 the slider is supported on a thin (typically, 0.05 $\mu$m) cushion of air (called an air bearing) between the surface of the disk 34 and the air bearing surface (ABS) 48. The magnetic head 40 may then be employed for writing information in multiple circular tracks on the surface of the disk 34, as well as for reading information therefrom. Processing circuitry 50 exchanges signals, representing such information, with the head 40, provides motor drive signals for rotating the magnetic disk 34, and provides control signals for moving the slider to various tracks. In FIG. 4 the slider 42 is shown mounted to the suspension 44. The components described hereinabove may be mounted on a frame 54, as shown in FIG. 3, FIG. 5 is an ABS view of the slider 42 and the magnetic head 40. The slider has a center rail 56 that supports the magnetic head 40, and has side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Prior Art Merged MR Head

Figure 6:
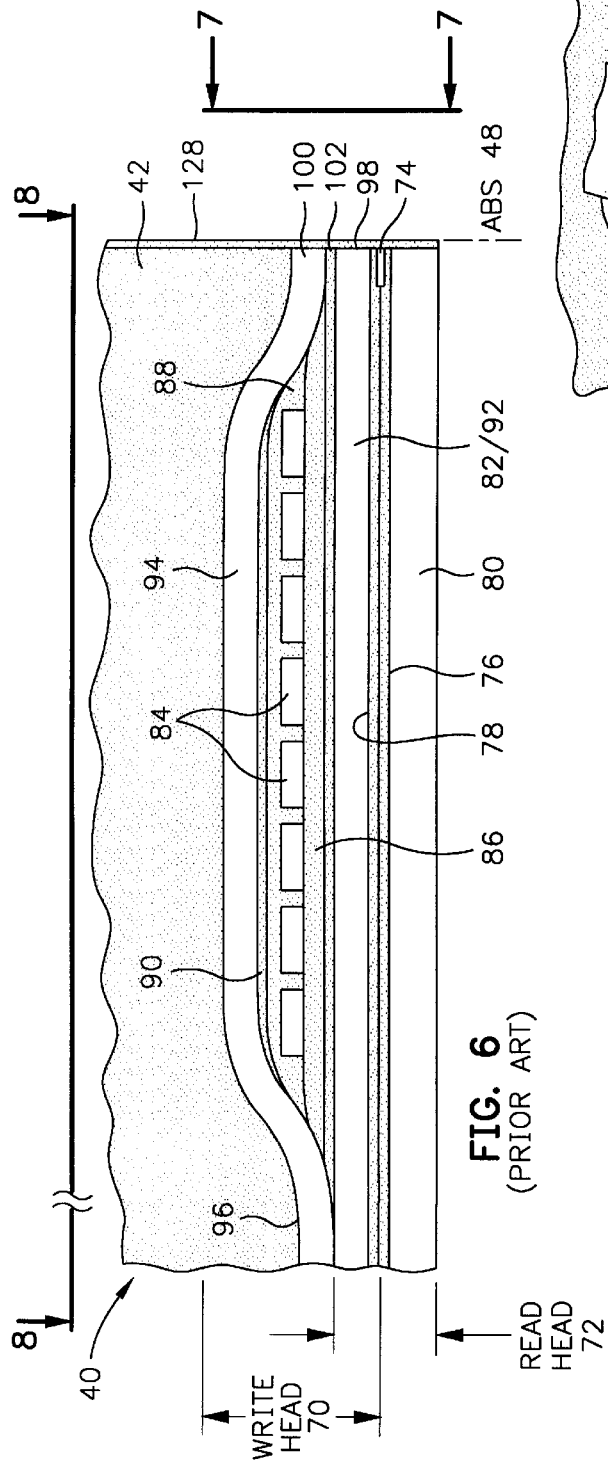
FIG. 6 is a partial view of the slider and a prior art magnetic head as seen in plane 6—6 of FIG. 2.
Figure 7:
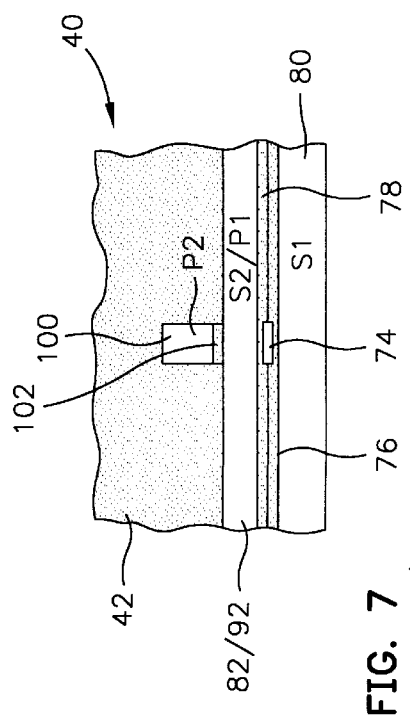
FIG. 7 is a partial ABS view of the slider taken along plane 7—7 of FIG. 6 to show the read and write elements of the prior art magnetic head.

In the following figures, insulation layers of the head have been stippled to distinguish them from metal layers of the head. FIG. 6 is a side cross-sectional elevation view of the merged MR head 40 which has a prior art write head portion 70 and a read head portion 72, the read head portion employing an MR sensor 74. FIG. 7 is an ABS view of FIG. 6. The sensor 74 is located between first and second gap layers 76 and 78 and the gap layers are located between first and second shield layers 80 and 82. In response to external magnetic fields, the resistance of the sensor 74 changes. A sense current Is conducted through the sensor causes these resistance changes to be manifested as potential changes. These potential changes are then processed as readback signals by the processing circuitry 50 shown in FIG. 3.

Figure 8:
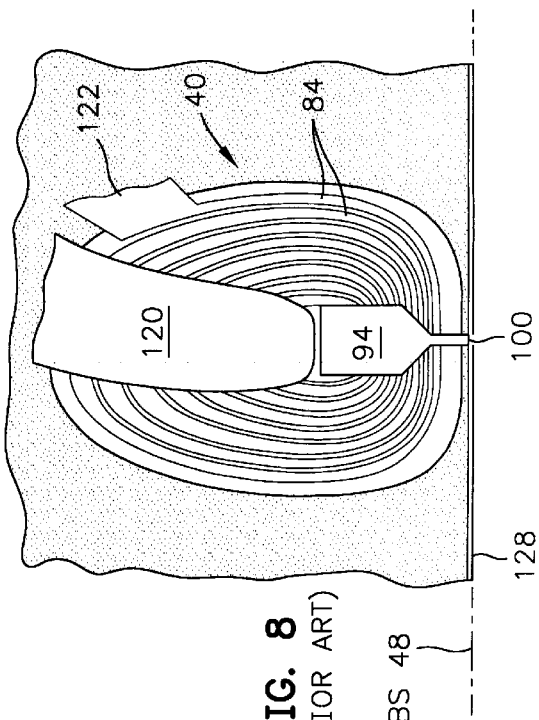
FIG. 8 is a view taken along plane 8—8 of FIG. 6 with all material above the second pole piece removed.

The prior art write head portion of the merged MR head includes a coil layer 84 located between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are located between first and second pole piece layers 92 and 94. The first and second pole piece layers 92 and 94 are magnetically coupled at a back gap 96 and have first and second pole tips 98 and 100 which are separated by a write gap layer 102 at the ABS. As shown in FIGS. 2 and 4, first and second solder connections 104 and 106 connect leads from the sensor 74 to leads 112 and 114 on the suspension 44 and third and fourth solder connections 116 and 118 connect leads 120 and 122 from the coil 84 (see FIG. 8) to leads 124 and 126 on the suspension. A wear layer 128 may be employed for protecting the sensitive elements of the magnetic head, as shown in FIGS. 2, 4, 6 and 7. It should be noted that the merged MR head 50 employs a single layer 82/92 to serve a double function as a second shield layer for the read head and as a first pole piece for the write head. A piggyback MR head employs two separate layers for these functions.

Figure 9:
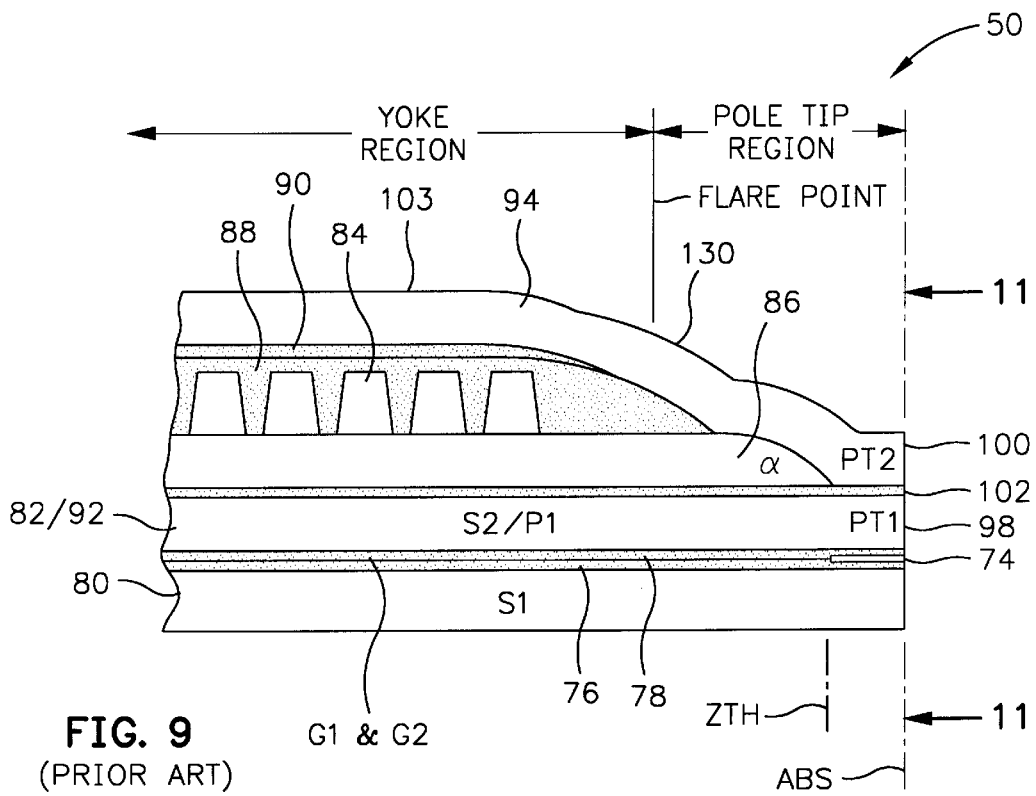
FIG. 9 is an enlarged front portion of the prior art magnetic head of FIG. 6 to show various details thereof.
Figure 12:
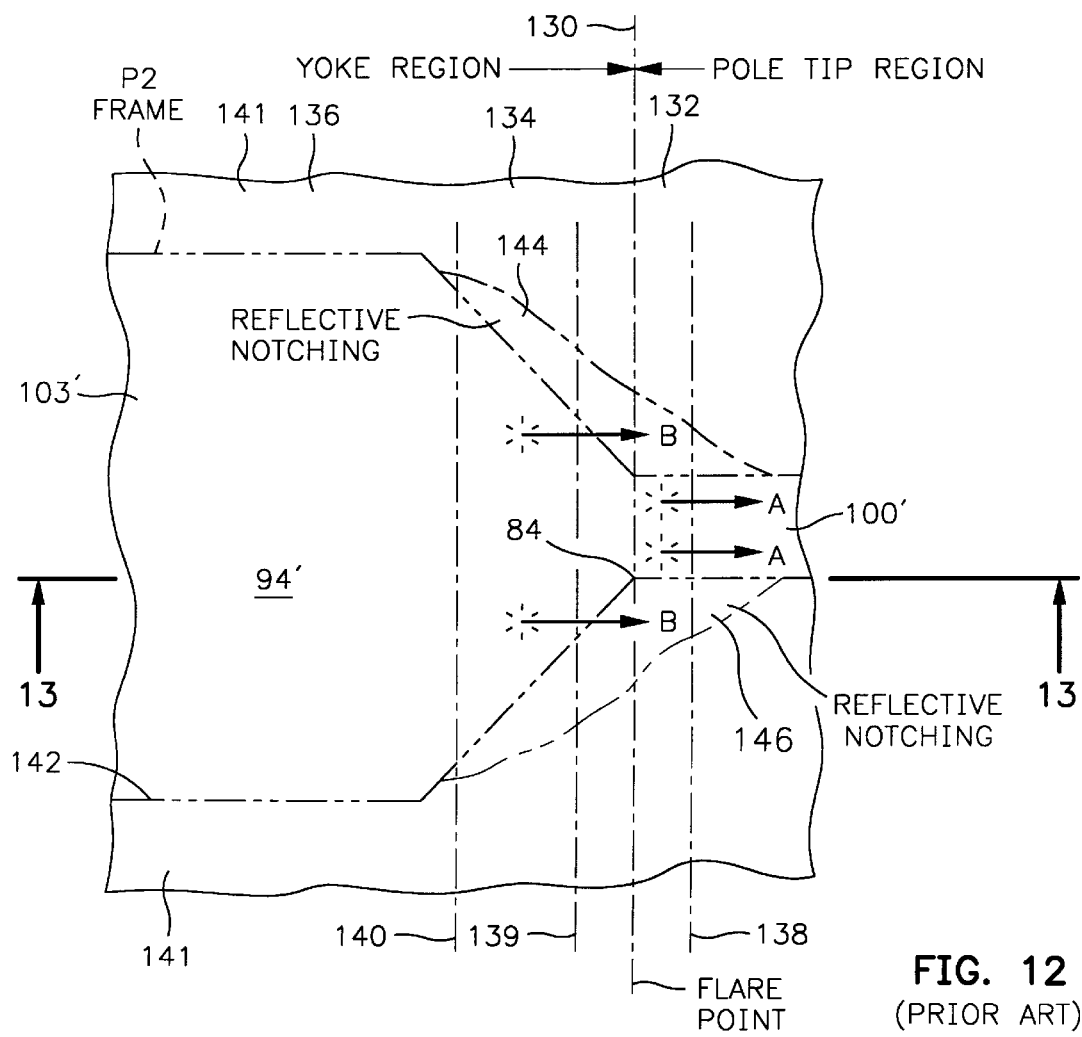
FIG. 12 is a view taken along plane 12—12 of FIG. 10.

As shown in FIG. 9, the second pole piece layer 94 has a pole tip region and a yoke region, the merging of these components being defined by a flare point 130 which is the location where the second pole piece layer 74 begins to widen as it recesses in the head. The second pole tip region extends from the ABS to the flare point 130, and the yoke region extends from the flare point 130 to the back gap 96 (see FIG. 6). In FIG. 12 are shown the pole tip region, the yoke region and the flare point 130 as defined by a photoresist mask (P2 frame).

Figure 13:
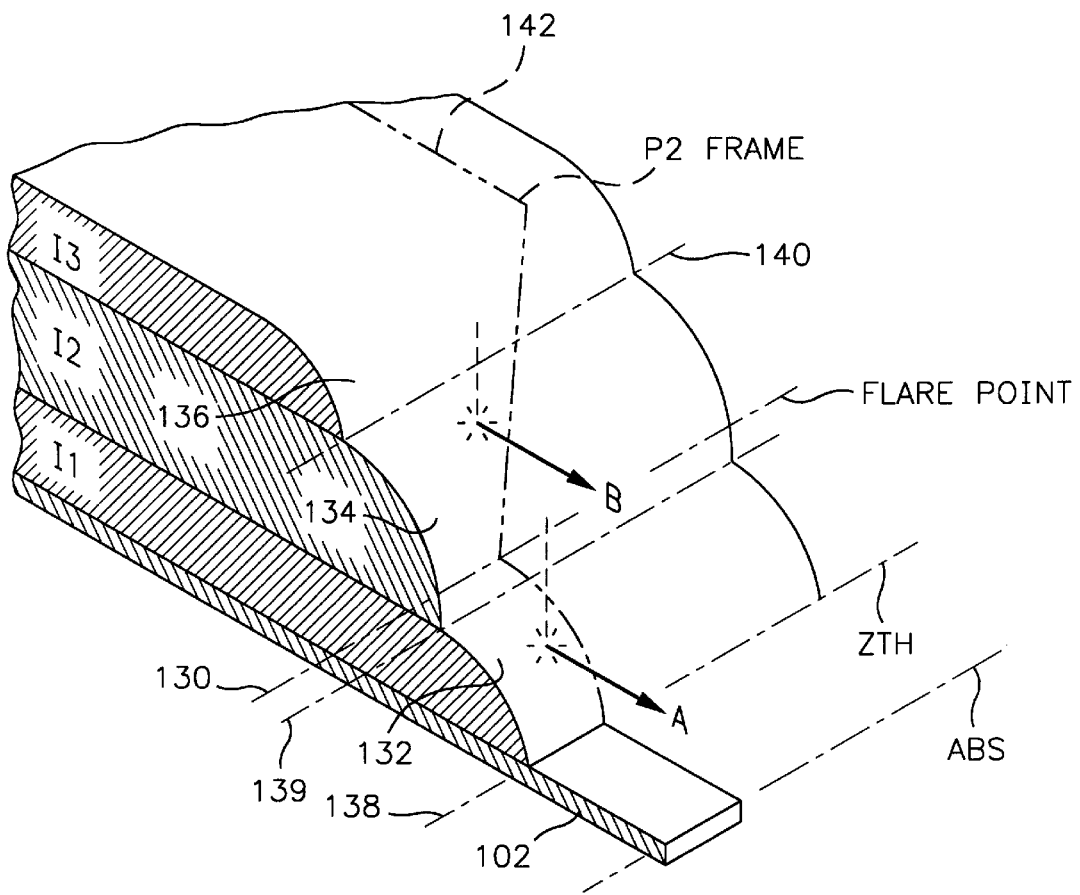
FIG. 13 is an isometric illustration of FIG. 10 without the P2 photoresist.

The location of the flare point 130, shown in FIGS. 9, 12 and 13, is an important design parameter of the write head. The further the flare point is recessed into the head, the longer the pole tip 100, which increases magnetic inductance and the likelihood that the pole tip 100 will saturate in response to flux from the coil layer 84. In the past it has been difficult to locate the flare point closer to the ABS than 10 $\mu$m because of a fabrication problem in making the second pole tip.

Another important design parameter in making the write head is the location of a zero throat height (ZTH), which is where the first and second pole piece layers 92 and 94 first separate behind the ABS, It is important to locate the ZTH as close as possible to the ABS (typically within about 1 μm) in order to reduce flux loss between the pole pieces before the fields reach the write gap layer 102 at the ABS. In the prior art, locating the ZTH close to the ABS contributed to the problem of fabricating a poorly-defined second pole tip 100.

Figure 10:
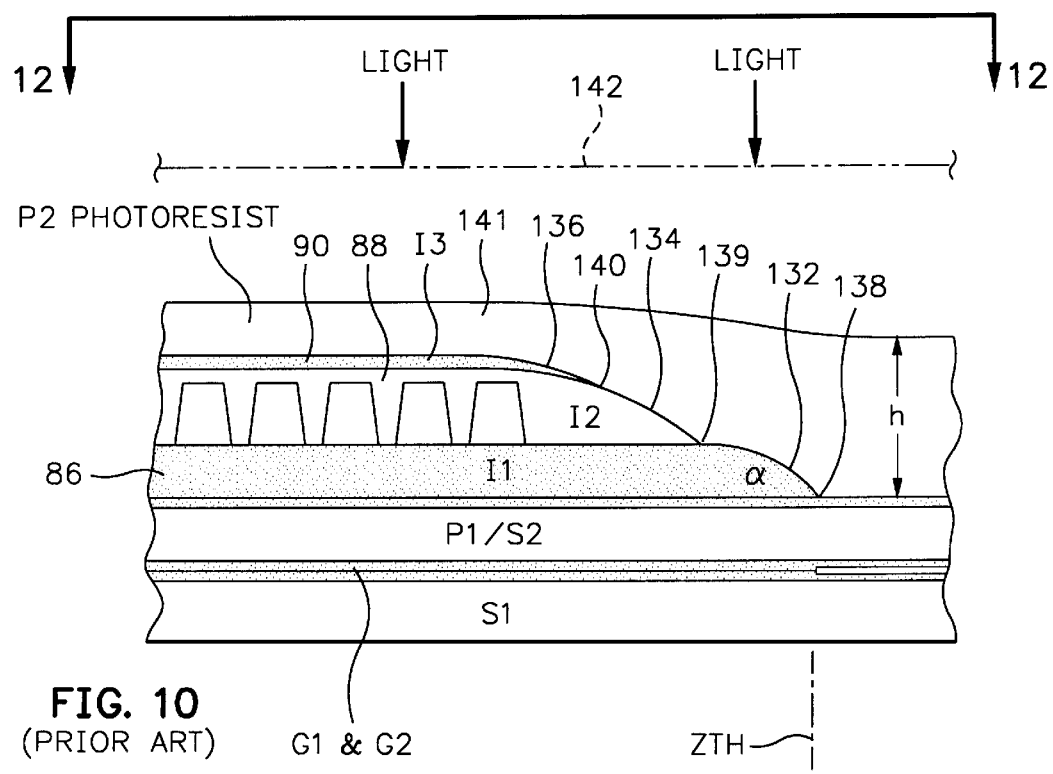
FIG. 10 is the same as FIG. 9 except a photo-patterning step is illustrated for constructing the second pole tip of the magnetic head.

FIG. 10 shows the prior art head of FIG. 9 during construction of the second pole piece 94 (see FIG. 9). In FIG. 10 the first, second and third insulation layers 86, 88 and 90 are shown with sloping surfaces 132, 134 and 136 respectively, which terminate at apexes 138, 139 and 140 respectively. As stated hereinabove, the first, second and third insulation layers are hard-baked photoresist which results in the sloping surfaces 132, 134 and 136 being highly reflective to light. All of the sloping surfaces 132, 134 and 136 face the pole tip region where the second pole tip 100 of the second pole piece 94 is to be formed. As shown in FIG. 10, the second pole piece is formed with a photoresist layer 141 that is spun on top of the partially completed head The height of the photoresist layer may be as much as 12 μm thick in the pole tip region and is typically approximately 4.5 μm thick above the third insulation layer 90. Since the flare point 130 of the second pole piece 94 (shown in FIGS. 9, 12 and 13) is located on the sloping surfaces of the insulation layers, light directed through a second pole-shaped opening (not shown) in a mask 142 will be reflected from the sloping surfaces forward toward the ABS into areas of the photoresist layer 141 adjacent the pole tip region. This causes the pole tip region to be wider than the opening in the mask 142. This is referred to as "reflective notching" and is illustrated in FIG. 12.

The photoresist pattern for the second pole piece is shown in FIG. 12 at 94', which comprises the second pole tip pattern 100' and the second pole piece yoke pattern 103'. This configuration is referred to as the "P2 frame". Reflective notching of the photoresist layer 141 (see FIG. 10) by light reflected at an angle of incidence from the sloping layers of the insulation layers is shown at 144 and 146 in FIG. 12. When light ray A is directed downwardly during photo-imaging, it is reflected at an angle of incidence from the insulation stack into the pole tip region without causing any reflective notching of the second pole tip. However, light ray B is reflected from the sloping surfaces of the insulation layers behind the flare point 130 at an angle of incidence into the photoresist 141 in a side region outside the intended pole tip pattern 100'. It is light reflection B and similar light reflections that cause the reflective notching shown in FIG. 12.

Figure 11:
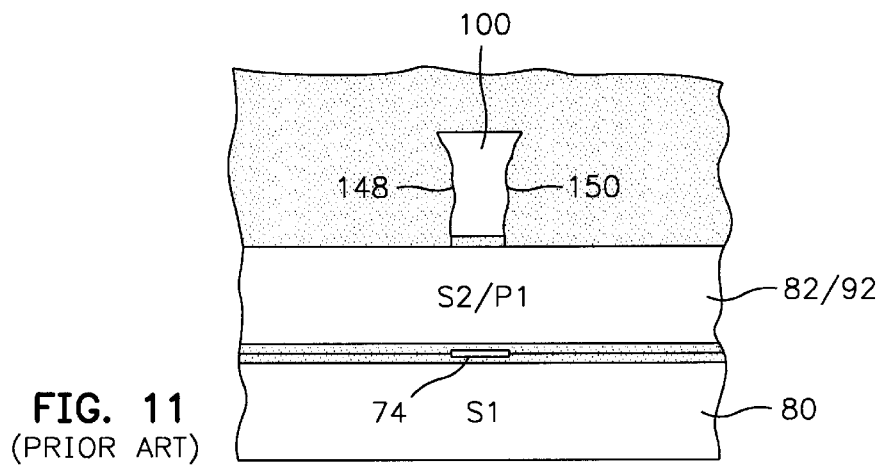
FIG. 11 is a view taken along plane 11—11 of FIG. 9.

When the second pole piece 94 is plated and the photoresist layer 141 is removed, the head is complete, as shown in FIG. 9. However, the pole tip 100 is poorly formed, exhibiting irregular side walls 148 and 150, as shown in FIG. 11. Furthermore, photoresist notching results in a second pole tip 100 that has wider areas at the upper pole tip region than at the base of the pole tip (adjacent the write gap). If the irregular second pole tip 100 is used as a milling mask to notch the first pole tip 98, the wider regions of the second pole tip shadows the milling beam. Thus, the milling process is less effective at removing the first pole tip material directly beneath the side walls of the second pole tip. This results in a poorly formed P1 notched write head structure due to incomplete notching of the first pole piece 72. These poorly formed pole tips result in side writing of adjacent tracks.

Figure 14:
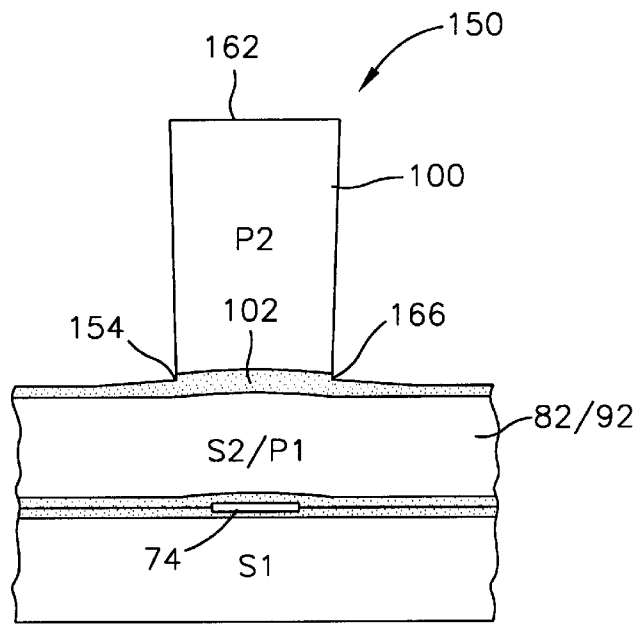
FIG. 14 is an ABS view of a prior art merged MR head before notching of the first pole piece.
Figure 15:
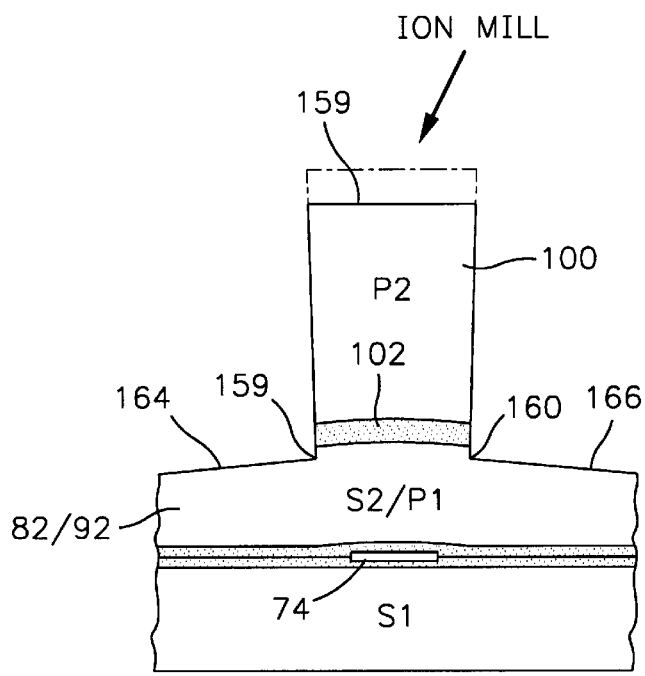
FIG. 15 is an ABS view of the merged MR head shown in FIG. 14 after ion milling to form the first pole piece with notches adjacent the second pole tip.

FIG. 14 is an ABS view of a prior art merged magnetic head 150 after a P2 seedlayer (not shown) has been removed by milling with an ion beam. It can be seen that the milling has slightly notched the write gap layer 102 at 154 and 156. One method of notching the first pole piece layer 82/92 in the prior art is to mill through the gap layer into the first pole piece layer, as shown in FIG. 15. This notches the first pole piece layer at 159 and 160. Notching of the first pole piece layer 82/92 is desirable since it minimizes side writing between the second pole tip 100 and the first pole piece 82/92. Unfortunately, the process shown in FIG. 15 results in consumption of a top surface 159 of the second pole tip 100, as shown by the phantom lines in FIG. 15. Since milling with an ion beam is typically performed at an angle to a normal to the thin film layers, as shown in FIG. 15, the second pole tip 158 shadows the milling of the notching at 159 and 160 approximately 50% of the time while the workpiece is rotated. Consequently, the first pole piece 82/92 is overmilled in locations 164 and 166 which extend in the field remote from the notches 159 and 160 respectively. This causes the first pole piece 82/92 to have downwardly sloping top surfaces 164 and 166, as shown in FIG. 15, which undesirably reduces the thickness of the first pole piece 82/92 in the field. This can potentially expose sensitive elements beneath the first pole piece 82/92 rendering the head inoperative. The write gap layer 102 mills more slowly than the Permalloy (NiFe) of the first and second pole pieces which results in more rapid ion milling of the top 159 of the second pole tip 100 and the fields 164 and 166 of the first pole piece 82/92 than the write gap layer 102.

Figure 16:
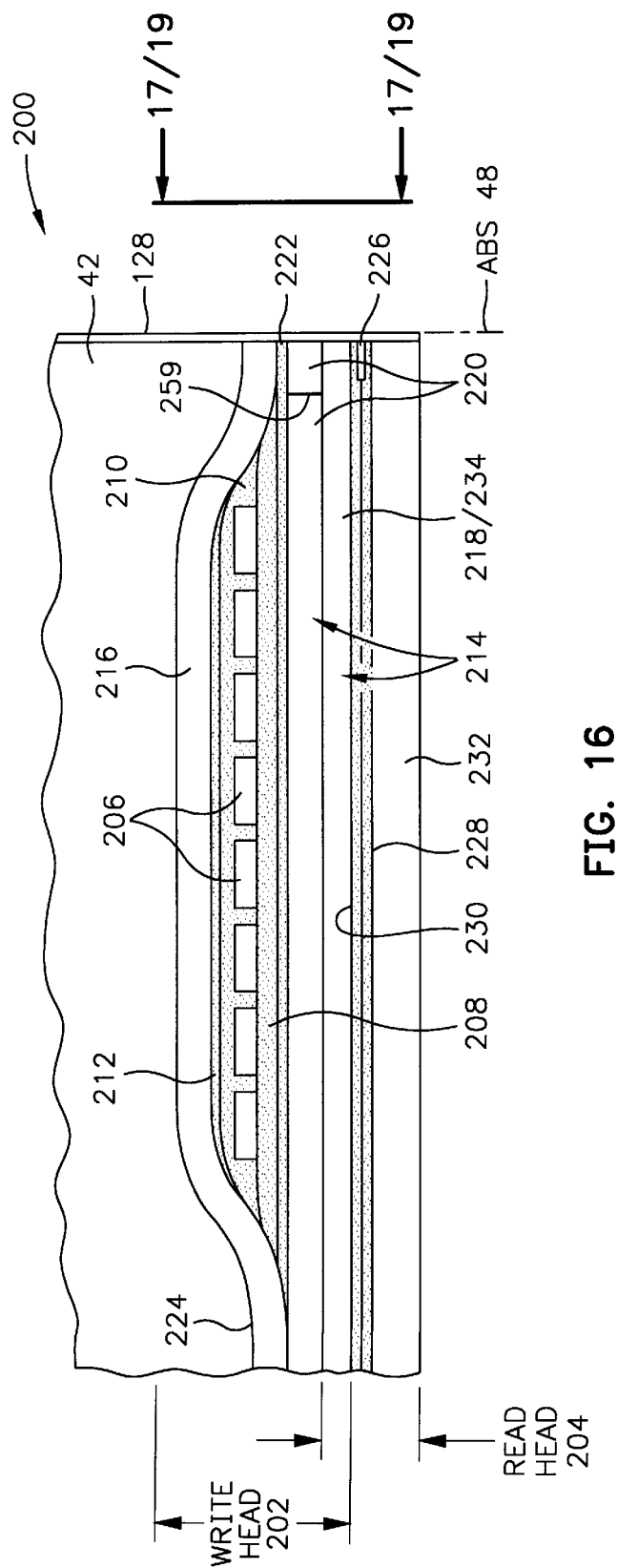
FIG. 16 is a longitudinal cross-sectional view of a portion of an inverted merged MR head which employs the present invention.

It can be seen from FIG. 15 that the beginning thickness of the second pole tip layer 100 has to be thicker than the final height of the second pole tip layer at 159 in order to compensate for the top portion of the second pole tip layer consumed by ion milling. This then requires the photoresist mask to be thicker, which increases the aforementioned problem of additional light scattering during the light photo-imaging step as the photoresist layer increases in depth. This means that the second pole tip must have substantial width because of loss of definition during the photoresist patterning. Another problem with the prior art head in FIGS. 14 and 15 is that the write gap 102 has a curvature due to replication of the profile of the MR sensor by the second gap layer 78 and the second shield/first pole piece layer 82/92. As discussed hereinabove, this causes information to be written in a curve across a track which is inaccurately read by the straight MR sensor 74. Accordingly, it can now be seen that the prior art merged MR head suffers from the disadvantages of reflective notching of the second pole tip, loss of a top portion of the second pole tip upon notching the first pole piece, and write gap curvature Inverted Merged MR Head FIG. 16 is a longitudinal cross-sectional illustration of an inverted magnetic write head 200 which has a write head portion 202 and a read head portion 204. The write head portion 202 includes a coil layer 206 that is located between first and second insulation layers 208 and 210. A third insulation layer 212 may be employed for planarizing the head to eliminate ripples in the second insulation layer caused by the one or more coil layers 206. The first, second and third insulation layers are referred to as an "insulation stack", The coil layer 206 and the first, second and third insulation layers 208, 210 and 212 are located between first and second pole pieces 214 and 216. The first pole piece 214 includes first and second pole piece layers 218 and 220 which will distinguish the inverted write head from the previously described prior art write head, as described in more detail hereinafter. The second layer 220 of the first pole piece is separated from the second pole piece la) ir 216 by a write gap layer 222 at the ABS. The second layer 220 of the first pole piece and the second pole piece layer 216 may be connected at a back gap 224.

A read sensor 226, which may be an anisotropic magnetoresistive (AMR) sensor or a spin valve sensor, is located between first and second gap layers 228 and 230 which are, in turn, located between first and second shield layers 232 and 234. In the preferred merged MR head the first layer 218 of the first pole piece and the first shield layer 234 are a common layer. In an optional piggyback head these are separate layers. It should be noted from FIG. 16 that edges of each of the MR sensor 226, the first and second layers 218 and 220 of the first pole piece and the second pole piece layer 216 form a portion of the ABS 48. The inverted write head 200 is embedded in the body of the slider 42 as shown in FIGS. 16 and 2.

Figure 17:
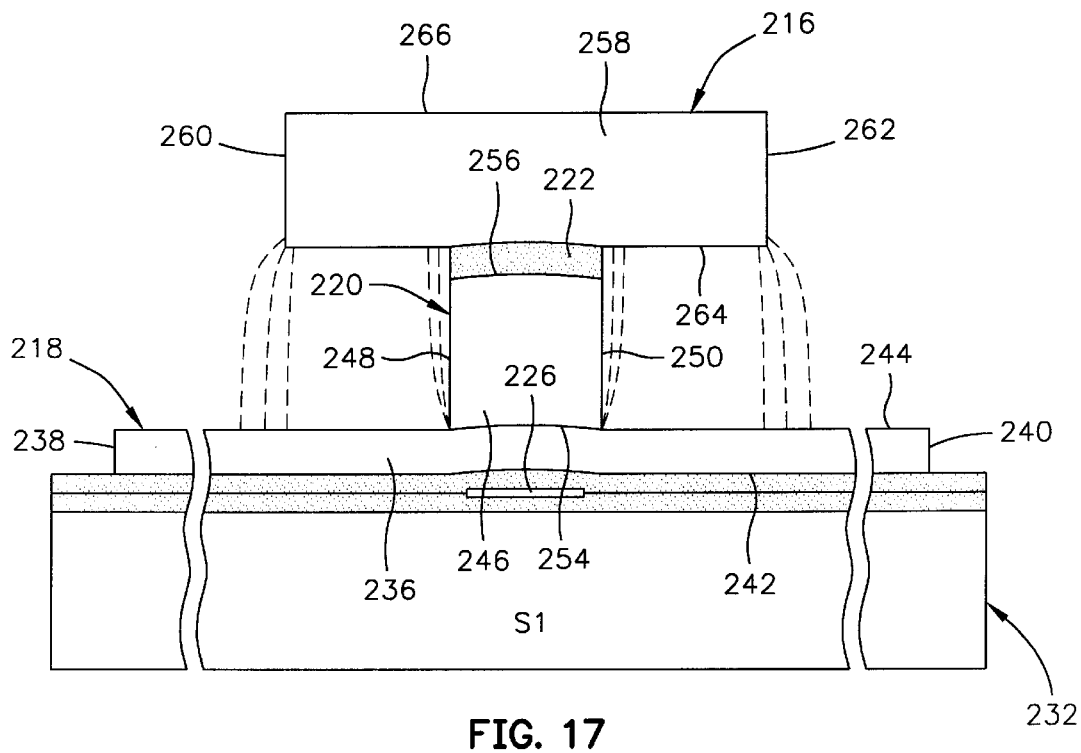
FIG. 17 is an ABS view taken along plane 17—17 of FIG. 16 showing an inverted merged MR head before modification by the present invention.
Figure 18:
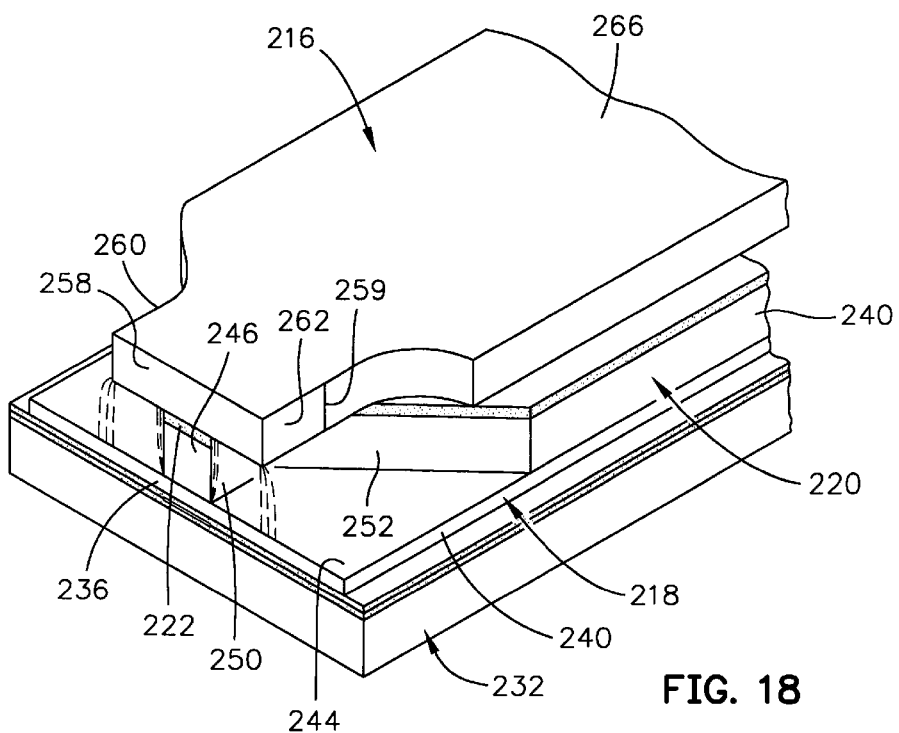
FIG. 18 is an isometric illustration of the inverted merged MR head shown in FIG. 17.

As shown in FIGS. 16–18, the first layer 218 of the first pole piece has a bottom first pole tip 236 which forms a portion of the ABS and has first and second side edges 238 and 240. The layer 218, which is preferably a flat layer, has first and second surfaces 242 and 244 which are partially bounded by the edges 238 and 240. The second layer 220 of the first pole piece is formed directly on the first layer 218 and has a top first pole tip 246 at the ABS that has first and second side edges 248 and 250. The second layer 220 of the first pole piece is preferably a flat layer and is bounded in part by first and second surfaces 254 and 256 and the first and second side edges 248 and 250. The second pole piece layer 216 has a second pole tip 258 and first and second side edges 260 and 262. The second pole piece layer 216 is partially bounded by first and second surfaces 264 and 266 and the first and second side edges 260 and 262. Because of the profile of the MR sensor 226 there is a slight curvature of a portion of the layers 218 and 220 which causes curvature of the write gap 222.

As shown in FIG. 17, the first pole tip 246 is located between the bottom first pole tip 236 and the second pole tip 258. The write gap layer 222 is located between the top first pole tip 246 and the second pole tip 218. Magnetic field signals fringe across this write gap layer 222 between the top first pole tip 246 and the second pole tip 258 to write magnetic information signals into a rotating magnetic disk. Because of the width of the second pole tip 258 beyond the side edges 248 and 250 of the top first pole tip, the field signal stream between the pole tips 246 and 258 expands slightly beyond the track width of the top first pole tip 246 causing the written track to be slightly wider than the track width defined by the top first pole tip 246. In order to narrow the track and increase the bits per inch (BPI) it would be desirable if this flux stream was more narrowly confined to the track width of the top first pole tip 246. This is accomplished by the invention described under the title "Improved Inverted Magnetic Write Head". As shown in FIG. 17, the magnetic disk preferably rotates upwardly so that the second pole tip 258 is the last pole tip to pass a written track on the disk The magnetic head is called an inverted write head because the top first pole tip 246 defines the track width of the head in contrast to the second pole tip 258 defining the track width of the head It can be seen from FIGS. 16–18 that the first and second layers 218 and 220 of the first pole piece 214 can be constructed without a reflective notching problem. The first layer 218 of the first pole piece 214 is constructed on the flat gap layers 228 and 230 and will likewise be flat, as shown in FIG. 16. The second layer 220 of the first pole piece is constructed on the first layer 218 and will also be flat.

Accordingly, the photoresist used to pattern the layers 218 and 220 will lie flat on the wafer and light will pattern the photoresist layer without any reflective notching. Further, the thickness of the photoresist for patterning is significantly less than the prior art which improves resolution during the light exposure step. Subsequently, the insulation stack, which comprises insulation layers 208, 210 and 212, and one or more coil layers 206 are constructed. When the second pole piece layer 216 is constructed, there may be some reflective notching during the patterning of the second pole piece layer 216. This will be immaterial since the second pole piece layer 216 does not define the track width of the head.

The top first pole tip 246 has the smallest width at the ABS. The second pole tip 258 has a width that is greater than the top first pole tip 246 and the bottom first pole tip 236 has a width that is greater than the second pole tip 258. The large width of the bottom first pole tip 236 is required for shielding the MR sensor 226, and the width of the second pole tip 258 is to ensure that a photoresist patterning step will bridge the top first pole tip 246 in spite of process variations in the photoresist patterning step. It should be noted that the zero throat height (ZTH) of the inverted magnetic head is still located at the separation of the first and second pole pieces 214 and 216 by the insulation stack (insulation layers 208, 210 and 212) and that the flare point will be defined at 259 where the second layer 220 widens as it extends toward the back gap 224.

Figure 19:
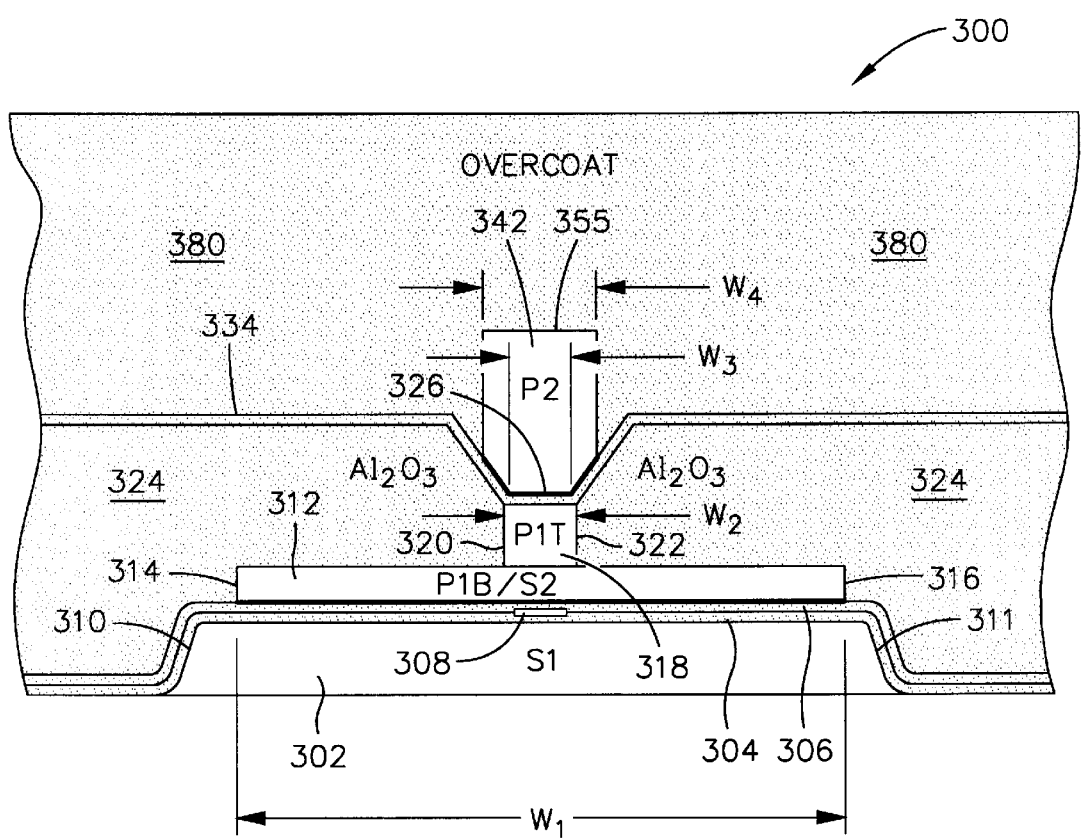
FIG. 19 is a view taken along plane 19—19 of FIG. 16 showing the present inverted merged MR head.
Figure 20:
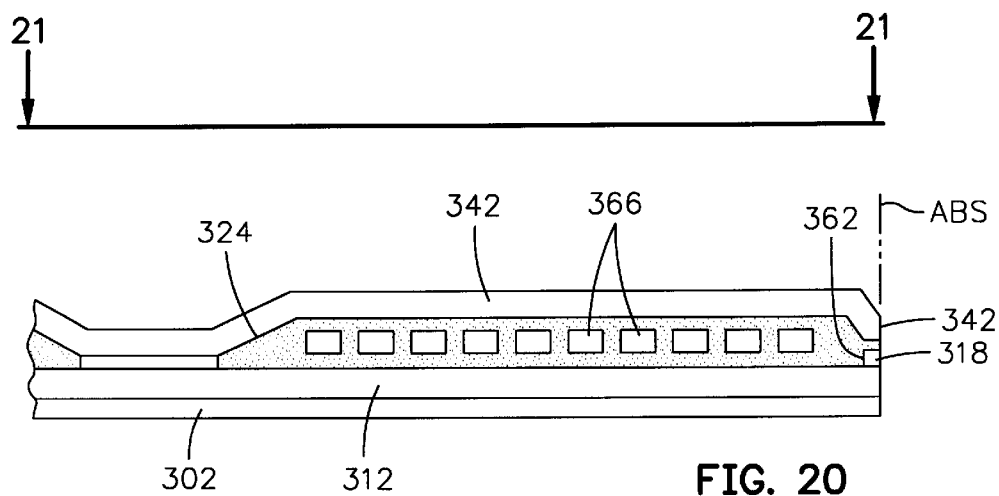
FIG. 20 is a longitudinal cross-sectional view of a portion of the present inverted merged MR head with the overcoat layer removed.
Figure 21:
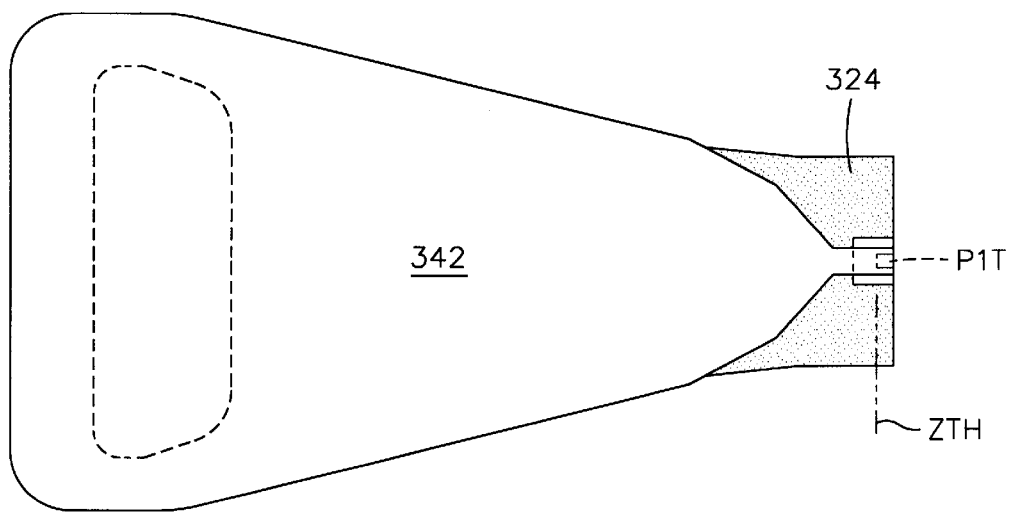
FIG. 21 is a view taken along plane 21—21 of FIG. 20.

As shown in FIG. 17, the problem that we found with the present inverted write head is that flux transfer between the top first pole tip 246 and the second pole tip 258 strayed, to some extent, laterally beyond the track width of the top first pole tip 246, thereby widening the written track. This results in less bits per inch (BPI) of the magnetic disk similar to a first pole piece without notching found in the prior art. Further, because of high flux density at the bottom corners of the second pole tip 258 stray flux occurs between the second pole tip 258 and the bottom first pole tip 218. We have overcome these problems by shaping and aligning the second pole tip 258, as shown in FIGS. 19–21. Another problem with the present inverted write head is that the write gap 222 has a curvature like the write gap 102 of the prior art write head shown in FIG. 15. This problem is also overcome by the present invention.

THE INVENTION

Improved Inverted Merged MR Head

FIGS. 19–22 illustrate an improved inverted merged MR head 300 according to this invention. The head includes a first shield layer 302, first and second read gap layers 304 and 306 and an MR sensor 308 which may be an anisotropic magnetoresistive (AMR) sensor or a spin valve sensor. The MR sensor 308 is located between the first and second read gap layers 304 and 306 and the first and second read gap layers 304 and 306 are formed on the first shield layer 302. The first shield layer 302 may have first and second side walls 310 and 311. A bottom first pole tip 312 is on the second gap layer 306 and has first and second side walls 314 and 316. A top first pole tip layer 318 is on the bottom first pole tip layer 312 and has a width W2 which is defined by first and second side walls 320 and 322. The width W2 is the track width of the merged MR head 300.

Figure 23:
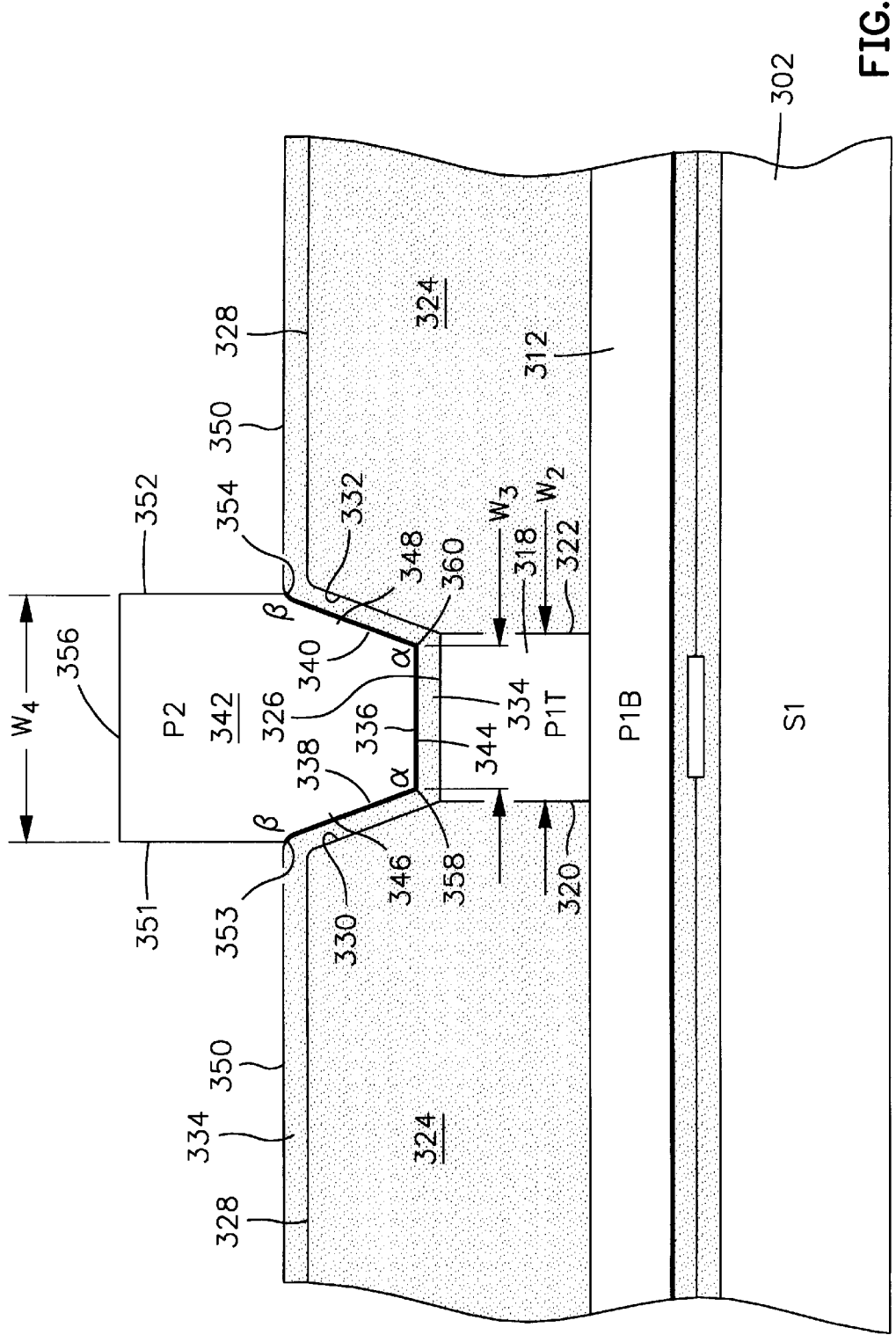
FIG. 23 is an enlarged ABS illustration of FIG. 19 so as to show various details of the present invention.

A non-magnetic, non-conductive second pole tip forming layer 324 covers the layers 302, 304, 306 and 312. As shown in FIG. 23, the top surface 326 of the top first pole tip 318 is below a top surface 328 of the second pole tip forming layer 324. The forming layer 324 has first and second tapered surfaces 330 and 332 which interconnect the top surface 326 of the top first pole tip 318 with first and second portions of the top surface 328 of the forming layer 324. This causes the top surface 326 and the tapered surfaces 330 and 332 to form a recess which is directly above the top surface 326 and is aligned therewith. This recess is formed by a unique method of making which is described hereinbelow.

A write gap layer 334 is located in the recess and substantially replicates the aforementioned recess as defined by a recessed surface 336 and first and second tapered edges 338 and 340. Located within the recess of the gap layer is a second pole tip layer 342 that has a bottom flat surface 344 and first and second tapered edges 346 and 348 which slope upwardly therefrom to the level of a top surface 350 of the write gap layer 334. The tapered edges 346 and 348 are contiguous with first and second vertical side walls 351 and 352 of the second pole tip layer. This will prevent any side writing of tracks because of potential flux leakage between intermediate corners 353 and 354 to the bottom first pole tip layer 312. With the improved inverted merged MR head 300, shown in FIGS. 19–23, the field signal transfer between the top first pole tip 318 and the second pole tip 342 will be more narrowly confined to the width $W_2$ of the top first pole tip 318, as compared to the field signal transfer between the top first pole tip 246 and the second pole tip 258 of the inverted merged MR head shown in FIGS. 17 and 18.

As shown in FIG. 19, the bottom first pole tip layer 312 has a lateral width $W_1$, the top first pole tip layer 318 has a width $W_2$ which defines the track width of the write head. The bottom flat surface 344 of the second pole tip has a width $W_3$ which is substantially the same as width $W_2$. The second pole tip 342 has a top surface 355 with a width $W_4$ and a flat bottom with a width $W_3$. On top of the tapered portion is a rectangular portion which has a width $W_4$ at its bottom and its top. Each of widths $W_2$, $W_3$ and $W_4$ are less than the width $W_1$. The widths $W_2$ and $W_3$ are preferably submicron and the width $W_4$ is preferably 1.5 to 4.0 times $W_2$ or $W_3$. As shown in FIG. 23, the angle α at each of the bottom corners 358 and 360 of the tapered portion of the second pole tip 342 is preferably in the range 110° to 150°. Accordingly, the angle β at each of the intermediate corners 352 and 353 is 120° to 160°. These angles can be easily constructed by the method described hereinafter.

Figure 22:
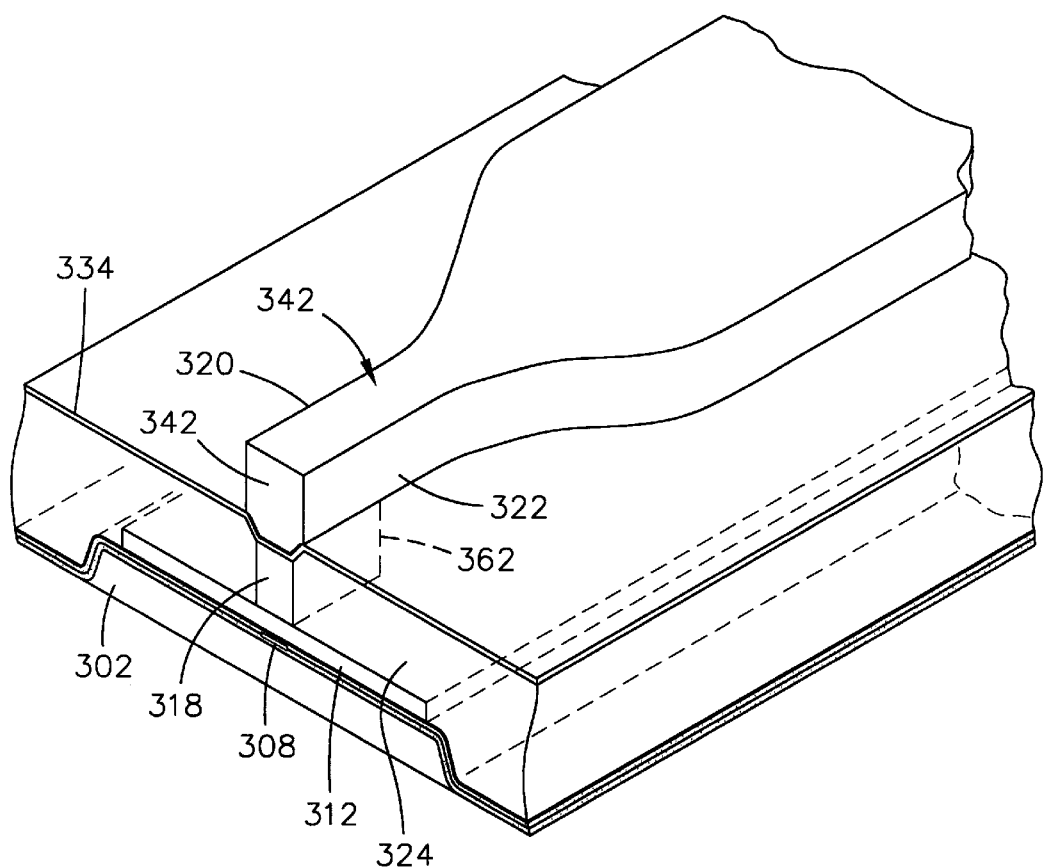
FIG. 22 is an isometric illustration of the present inverted merged MR head.

In the preferred embodiment the thickness of the bottom first pole tip layer 312 is 0.5 to 1.5 μm. It should be noted that, by keeping this layer relatively thin, this further prevents any flux transfer between the intermediate corners 353 and 354 of the second pole tip layer 342 to the bottom first pole tip layer 312. The thickness of the top first pole tip layer 318 is preferably 1.5 to 10 times the thickness of the write gap layer 334. The depth of the recess formed by the surfaces 326, 330 and 332 in FIG. 23 is preferably 1 to 3 μm. The write gap layer 334 is preferably 0.1 to 0.5 μm thick. As shown in FIGS. 20 and 22, the top first pole tip 318 has a back wall 362 that forms a zero throat height (ZTH) of the write head where the first and second pole pieces first commence to separate after the ABS.

Method of Making

A method of making the improved inverted merged MR head 300, shown in FIGS. 19–23, includes a series of process steps in FIGS. 24–64 Although these steps are explained and illustrated as discrete elements of a method, it should be understood that they may be combined with each other and/or with other steps common to the manufacture of merged heads which are not shown. Further, although there is a preferred sequence to the steps shown, it should be understood that variations in the sequence may occur to the skilled artisan. The various layers of the method of making may be formed by sputter deposition or plating. Generally, the metallic layers are formed by plating and the non-conductive layers are formed by sputter deposition. Sputter deposition is implemented in a vacuum chamber wherein a target of desired material is sputtered to a substrate via a plasma in the chamber due to an applied potential between the target and the substrate. Plating is a wet process wherein the wafer is placed in an electrolyte and a potential is applied between the surface to be plated and a plating material Metallic ions from the plating material are then deposited on the desired surface. Masking is accomplished by photoresist masks which are spun onto the wafer, imaged with light where portions of the photoresist layer are to be removed and then the portions are removed by a developer. After the desired layer is deposited through openings in the photoresist mask, the mask is then stripped by a dissolvent. Layer portions may be removed by ion milling which, in essence, is particle bombardment of the layer with ions. It should be understood that these process steps are exemplary and that other steps well known in the art may be employed for forming the layers. Many of the figures are referred to as ABS views, however, these views are, in essence, views of ABS sites, since the ABS is not formed until after rows and columns of magnetic heads on a wafer are cut into rows and lapped.

Figure 24:
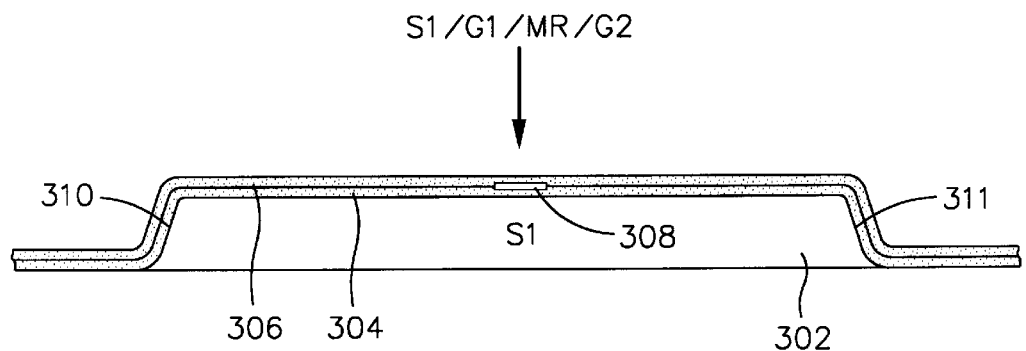
FIG. 24 is an ABS illustration of the first steps in the present method of making the present inverted merged MR head.

In FIG. 24 the first shield layer (S1) 302, the first gap layer (G1) 304, the MR sensor (MR) 308 and the second gap layer (G2) 306 are formed on a wafer substrate (not shown) with the first shield layer having first and second side surfaces 310 and 311. The wafer substrate (not shown) may have a plurality (magnetic head sites arranged in rows and columns.

Figure 25:
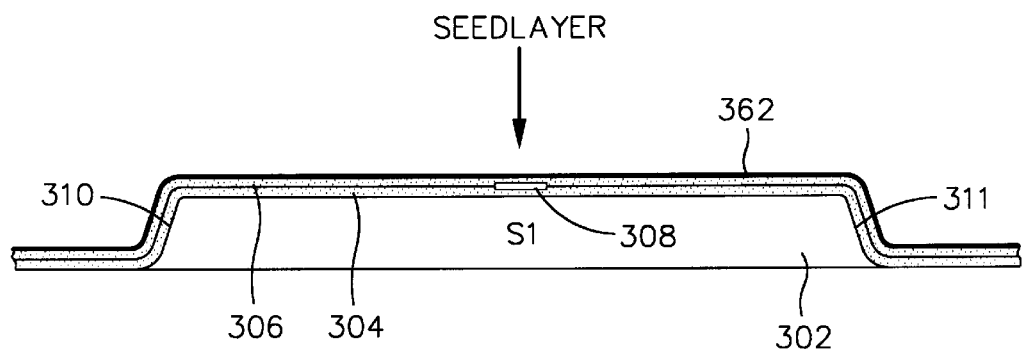
FIG. 25 is the same as FIG. 24 except a seedlayer has been deposited.
Figure 26:
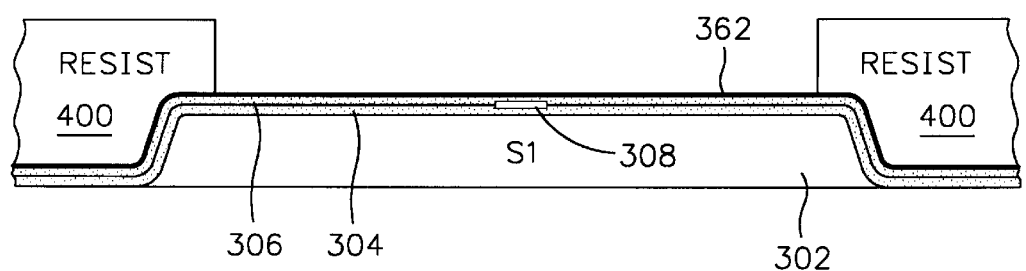
FIG. 26 is the same as FIG. 25 except a photoresist mask has been formed for depositing a top first pole tip layer.

FIG. 25 is the same as FIG. 24 except a seedlayer, shown by the heavy line 362, has been deposited by sputtering on the second gap layer 306. A seedlayer is necessary for the deposition of the next metallic layer which is described hereinbelow. FIG. 26 is the same as FIG. 25 except a photoresist mask 400 has been formed with an opening for the plating of the next metallic layer. FIG. 27 is the same as FIG. 26 except the bottom first pole tip layer 312 has been plated on the seedlayer 362. FIG. 28 is the same as FIG. 27 except the mask 400 has been removed.

Figure 32:
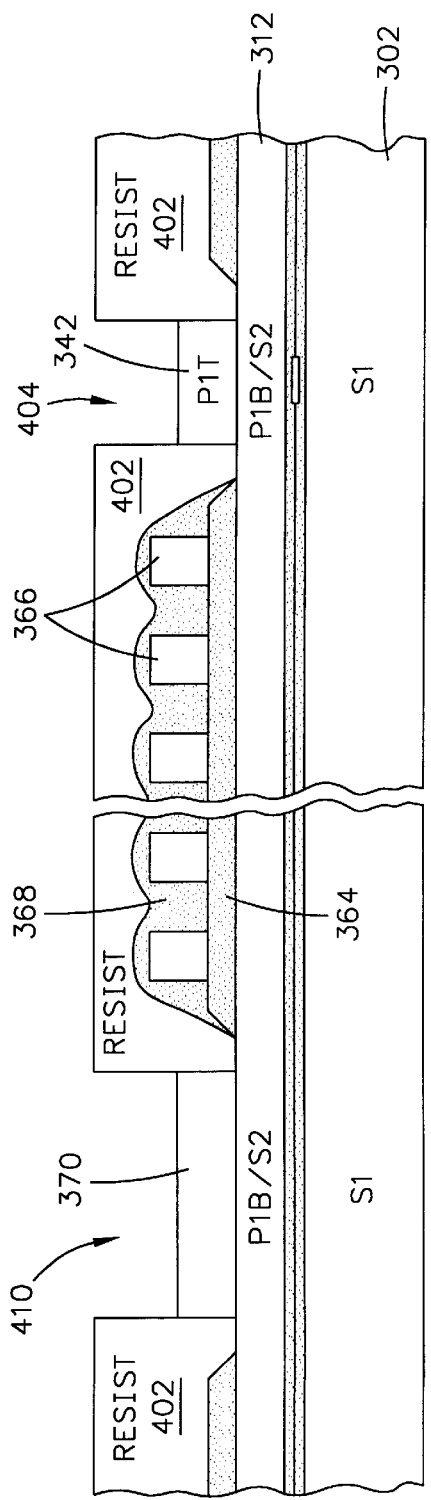
FIG. 32 is a longitudinal cross-sectional view of FIG. 31 taken along plane 32—32 of FIG. 31.

As shown in FIG. 29, a first insulation layer (I1), a write coil layer and a second insulation layer (I2) may be formed on the bottom first pole tip 312, as shown at 364, 366 and 368 respectively in FIG. 32. The first and second insulation layers 364 and 368 may be hard baked photoresist layers or alumina layers. The write coil 366 may be formed by frame plating, as discussed hereinabove.

Figure 31:
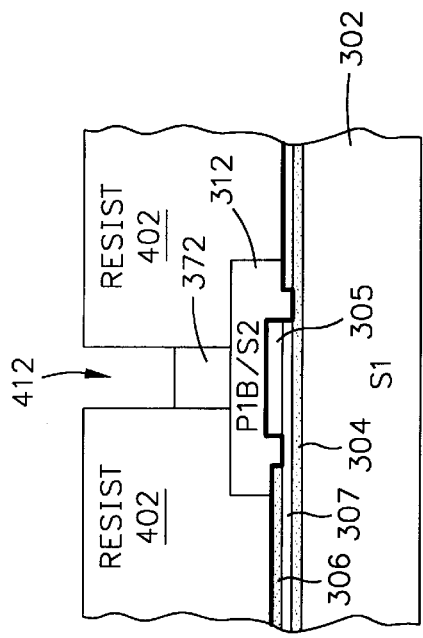
FIG. 31 is the same as FIG. 30 except the top first pole tip layer has been formed.

In FIG. 30 a photo resist mask 402 is spun on the wafer, after which it is light exposed and developed to provide an opening 404 that has substantially vertical side walls 406 and 408. In FIG. 31 the top first pole tip layer 318 is plated in the opening 404 of the photoresist layer providing the top first pole tip layer with substantially vertical side walls 320 and 322 which define the track width of the write head. FIG. 32 shows that the photoresist layer is also provided with another opening 410 at a back gap site where the first and second pole pieces will be connected. A top first pole tip portion 370 is plated through the opening 410 simultaneously with plating the top first pole tip 318 through the opening 404 for a purpose to be described hereinafter. The coil layer 366 is shown between first and second insulation layers 364 and 368.

Figure 33:
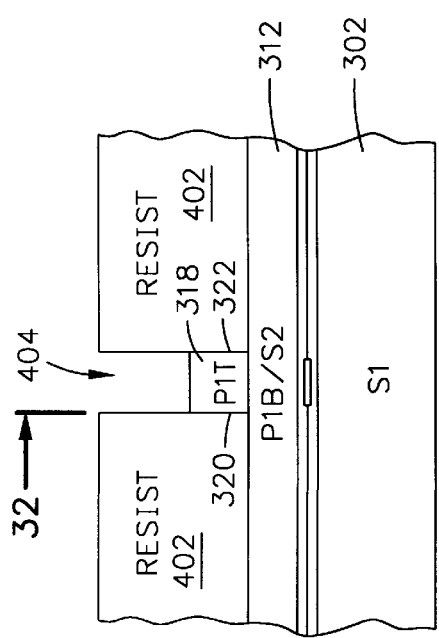
FIG. 33 is an elevational view of a portion of the substrate showing deposition of a portion of the top first pole tip layer at a stud site.

In FIG. 33 the photoresist layer 402 is shown with still another opening 412 for depositing a top first pole tip layer portion 372 at a stud site for one of the terminals for the write head or the read head. The photoresist layer will have four openings for the four stud sites, two of which are provided for the read terminals and two of which are provided for the write terminals. The read terminals are connected through the stud sites to the MR sensor and the write terminals are connected through the stud sites to the one or more coil layers of the write head. At the stud site is a pad 305 which is connected to a lead layer 307, the lead layer 307 being located between the first and second read gap layers 304 and 306. A seedlayer (heavy line) is employed for plating the bottom first pole piece layer 312 on the pad 305. The deposition of the top first pole tip layer 372 in the opening 412 at the stud site minimizes etching in order to provide a via for the stud.

Figure 34:
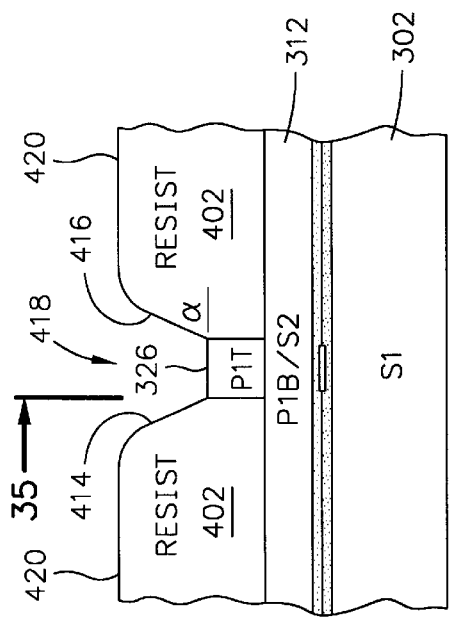
FIG. 34 is the same as FIG. 31 except the photoresist layer has been hard baked causing sloping side walls above the top first pole tip.
Figure 35:
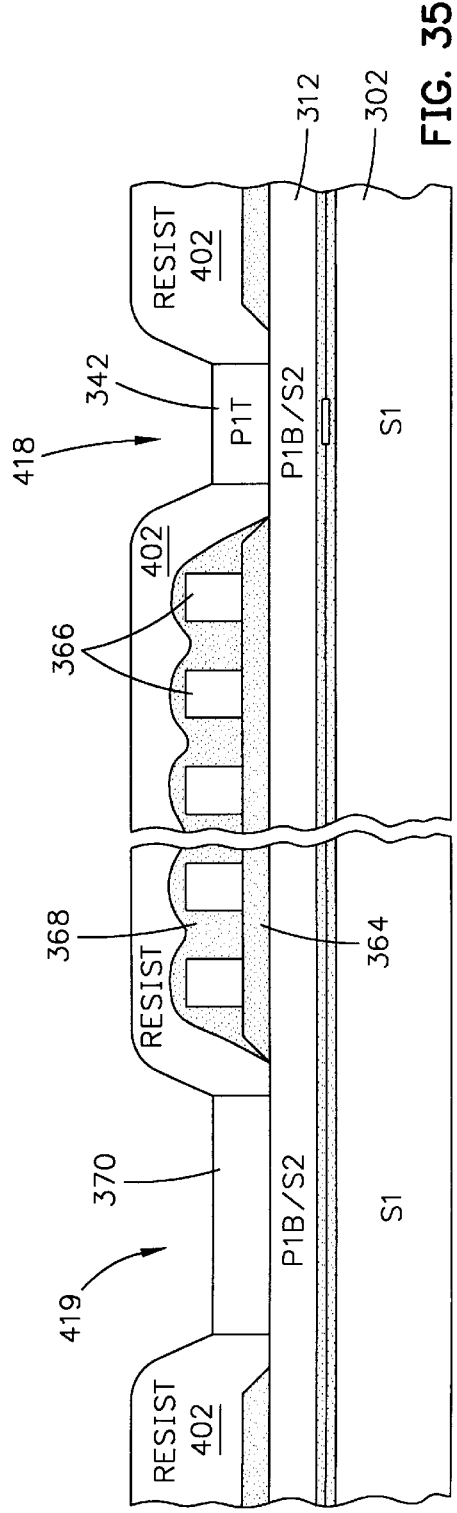
FIG. 35 is a view taken along plane 35—35 of FIG. 34.

In FIGS. 34 and 35 the photoresist layer 402 has been baked causing the side walls to be tapered, as shown at 414 and 416 in FIG. 34. The top surface 326 of the top first pole tip 318 and the side walls 414 and 416 of the photoresist layer form a remainder tapered opening 418 in the photoresist layer which plays an important function in the method of construction and the final write head produced thereby. The photoresist layer 402 is an organic resin which is preferably soft baked at a temperature of 110° to 140° C. This will provide an inside angle α which depends upon the baking temperature of the photoresist. The higher the baking temperature the lower the angle. It should be noted that the depth of the photoresist layer 402 from its top surface 420 to the top surface 326 of the top first pole tip 318 is dependent upon the thickness of the photoresist layer 402. A distinct advantage of the present invention is that the depth of the recess 418 can be constructed comparatively deep, such as 1 to 3 μm. It should be noted from FIG. 35 that the soft baking also provides the photoresist 402 with a remainder recess 419 at the back gap. The same is true at all of the stud sites (see FIG. 33), however, the sloping side walls due to the soft baking at these stud sites is not shown since it can be easily visualized.

As shown in FIG. 36, a sacrificial layer 426 is frame plated in the opening 418 on the top surface 326 of the top first pole tip 318. The sacrificial layer 426 conforms to the shape of the recess 418 in the photoresist layer and has top and bottom flat surfaces 428 and 430 which are interconnected by tapered side walls 432 and 434. The bottom surface 430 has the same width as the top surface 326 of the top first pole tip. As shown in FIG. 37, a sacrificial layer portion 436 is also plated on the layer 370 at the back gap. Simultaneously, a sacrificial layer portion is also plated at each of the stud locations which will be discussed in more detail hereinafter.

In FIGS. 38–40 the photoresist layer 402 has been removed. As shown in FIGS. 38 and 39, removal of the photoresist layer leaves layers 342 and 426 freestanding at a pole tip site and layers 370 and 436 freestanding at a back gap site. Further, it leaves freestanding at all four stud sites, one of which is shown in FIG. 40, the layer 372 and a sacrificial layer portion 438. Subsequently, the layers 426 and 436 will be removed, however, the layer 438 at the stud site will remain to form a portion of the stud, which will be described in more detail hereinafter.

Figure 41:
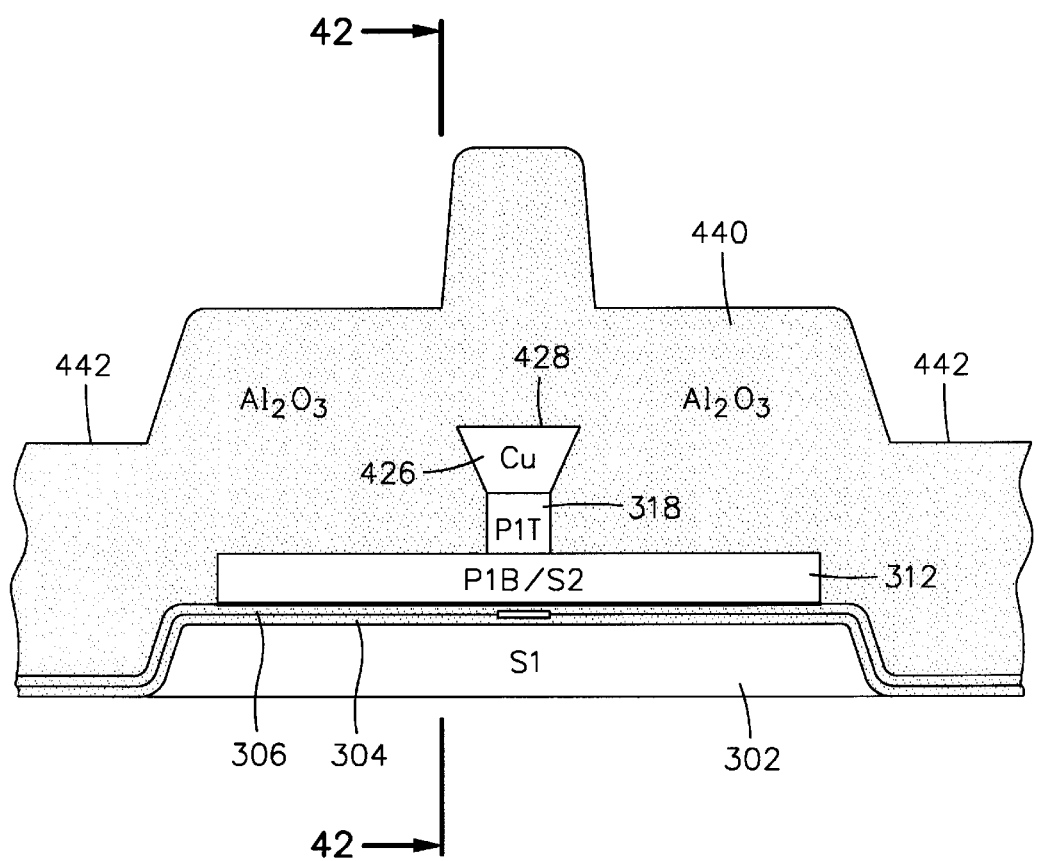
FIG. 41 is the same as FIG. 39 except a forming layer has been deposited.
Figure 42:
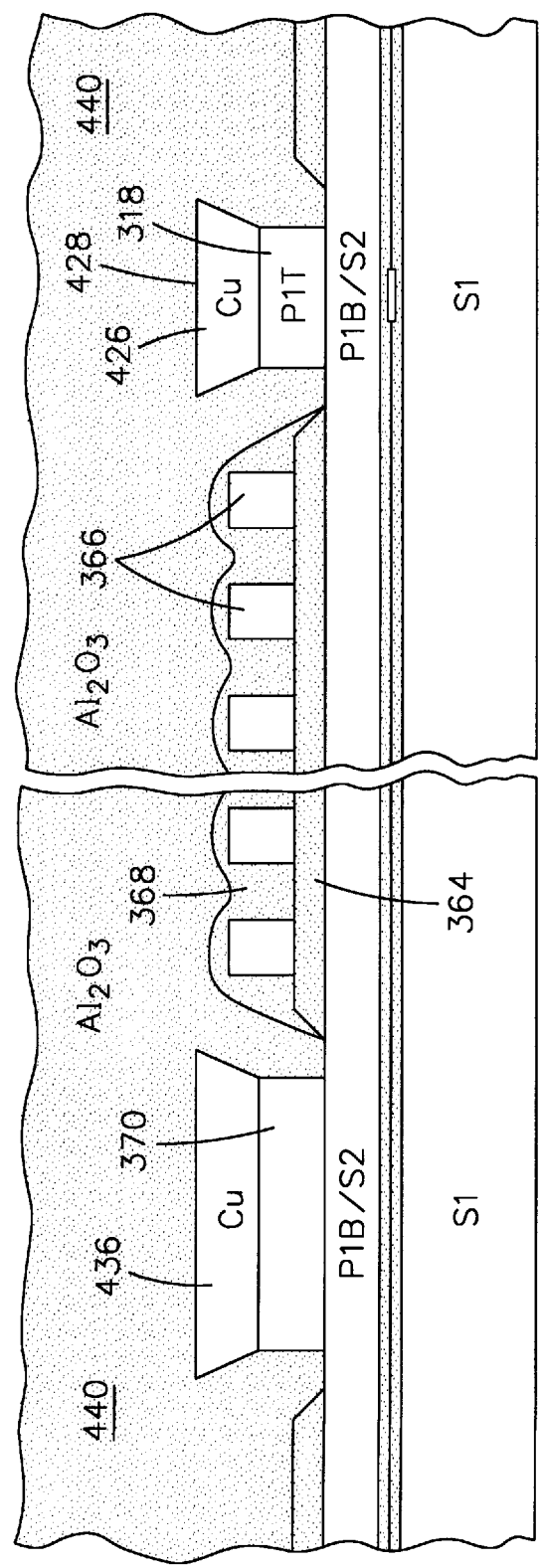
FIG. 42 is a view taken along plane 42—42 of FIG. 41.

As shown in FIGS. 41 and 42, a forming layer 440, which is preferably alumina ($Al_2O_3$), is deposited on the wafer which develops a high profile above the bottom first pole tip layer 312 and yet a higher profile above the top 428 of the sacrificial layer 426. However, in a field beyond the sacrificial layer 426 and the bottom first pole tip 312 the forming layer 440 has a top surface 442 which is preferably lower than the top surface 428 of the sacrificial layer 426. The difference in these levels is preferably 0.5 to 3 μm. The forming layer will also cover the sacrificial layer 436 at the back gap, as shown in FIG. 42, and will cover the sacrificial layers at the stud sites (not shown).

As shown in FIGS. 43–45 the top surfaces 428 of the sacrificial layers 426, 436 and 438 at the pole tip region, the back gap region and the stud site respectively, and the top surface 442 of the forming layer are lapped until they are flush with one another to form the forming layer 324 Next, the sacrificial layers 426 and 436 at the pole tip and back gap sites are removed by etching, as shown in FIGS. 46 and 47. The sacrificial layer 438 at the stud site 45 is not removed and may be left in place by covering this site with photoresist to protect it from the etching step. It will remain as shown in FIG. 45 It is important that the removal step not remove forming layer 324 or any of the pole tip components. In a preferred embodiment the sacrificial layer 426 is copper (Cu), the bottom first pole tip 312 and the top first pole tip 318 are Permalloy (NiFe) and the forming layer 324 is alumina ($Al_2O_3$). It is important that the sacrificial layer 426 be removed by an etchant that will not etch the NiFe of the bottom and top first pole tips 312 and 318 and the forming layer 324. Suitable etchants to accomplish this purpose are ammonia hydroxide ($NH_4$, OH) and ammonia persulfate $(NH_4)_3 (SO_4)_2$.

Figures 48, 49:
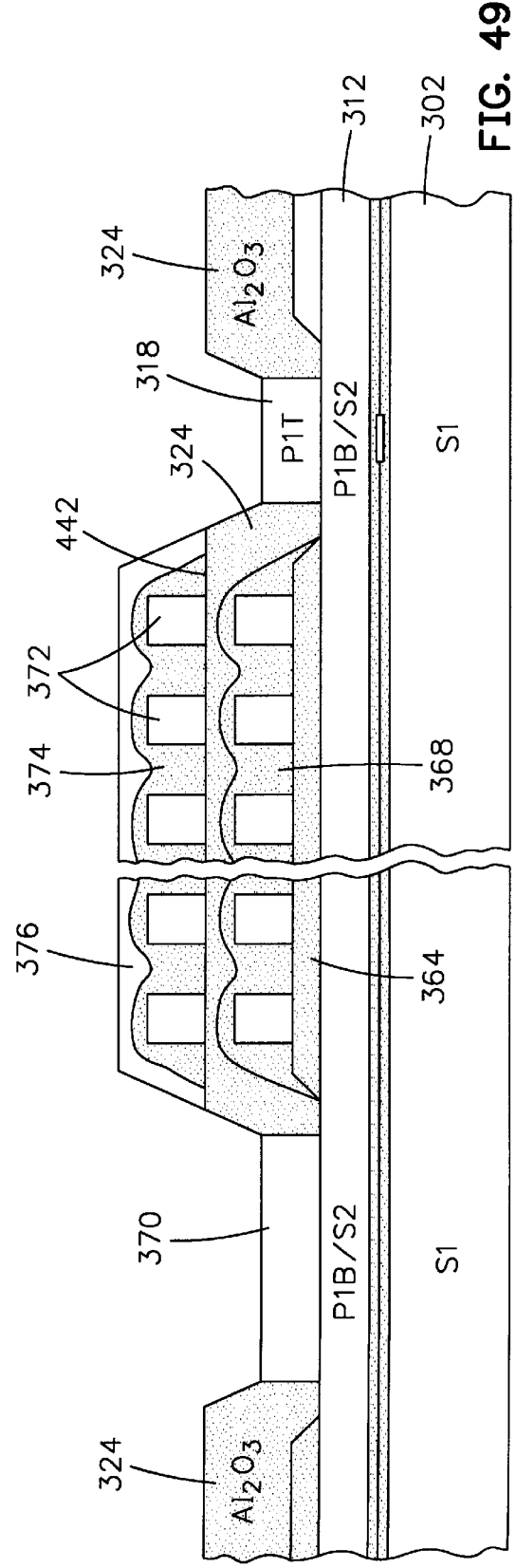
FIG. 48 is a block diagram showing an optional construction of a second coil and first and second insulation layers.
FIG. 49 is the same as FIG. 47 except an optional second coil and first and second insulation layers are formed on the forming layer.

FIGS. 48 and 49 illustrate an optional construction of a second coil layer 372 on the top lapped surface of the forming layer. After formation of the coil 372 by frame plating, second and third insulation layers (I3) 374 and (I4) 376 may be formed on the coil layer 372 and hard baked at 250° C. Another option is shown in FIGS. 50 and 51 wherein a single coil layer 378 is frame plated on the top surface 442 of the forming layer 324 followed by second and third insulation layers (I2') 380 and (I3') 382. Well-formed coil layers can be plated on top of the top surface 442 of the forming layer since the top surface has been lapped and is extremely flat.

In FIGS. 52 and 53 a write gap layer 334 is deposited and a seedlayer 350 (heavy line) is deposited on the write gap layer. Between these two steps the write gap layer 334 may be slightly etched for clean-up purposes before depositing the seedlayer 350. It should be noted that deposition of the seedlayer on the write gap layer 334 will protect it from subsequent process variations. Because of the thinness of the write gap and seedlayers 334 and 350 the recesses 418 and 419 in FIG. 53 will have substantially the same bottom and sloping surfaces as recesses 418 and 419 in FIG. 35. As shown in FIGS. 54 and 55, a photoresist layer 444 is formed on top of the forming layer 324 with an opening 446 that has side walls 448 and 450. The side walls 448 and 450 are preferably inboard of the top width of the tapered opening 418 so that a second pole tip can be formed without 90° corners.

As shown in FIGS. 56 and 57, the second pole tip 342 is plated in the tapered openings at the pole tip and back gap regions 418 and 419. The second pole tip 342 is preferably plated higher than the tapered opening to provide the second pole tip with a bottom tapered portion and an upper rectangular portion, as discussed hereinabove. It should be noted that the intermediate corners 353 and 354 of the second pole tip 342 have inside angles β (see FIG. 23) which are larger than 90° so as to minimize flux concentration at these corners and flux leakage to the bottom first pole tip 312. Prior to formation of the second pole tip layer the write gap layer at the back gap is removed by masking and etching, as shown in FIG. 57. Accordingly, the second pole tip layer 342 will make good connection with the bottom pole tip layer 312 via the top first pole tip layer 370 at the back gap. In FIGS. 58 and 59 the photoresist layer 444 has been removed and in FIGS. 60 and 61 an overcoat layer 380 is placed over the entire wafer after the seedlayer has been removed by sputter etching or ion milling. This substantially completes the construction of the write head portion of the merged MR head.

Figure 62:
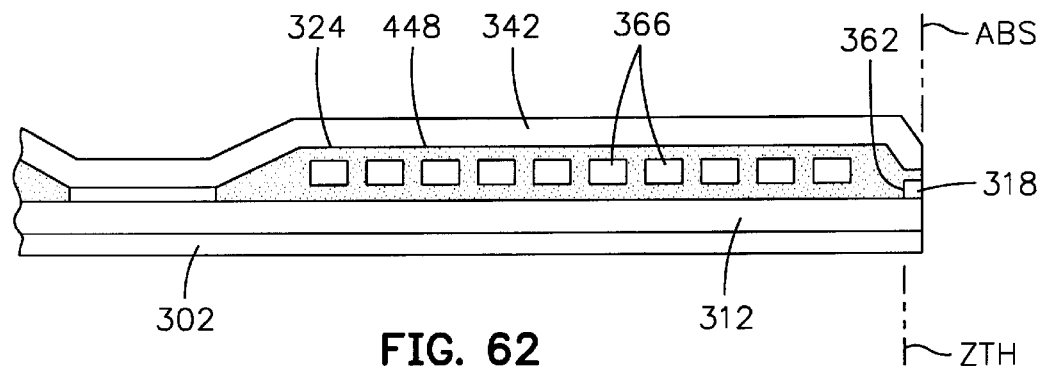
FIG. 62 is a longitudinal cross-sectional illustration of the present head showing a first embodiment of the invention wherein a single coil is embedded in insulation layers and the forming layer.
Figure 63:
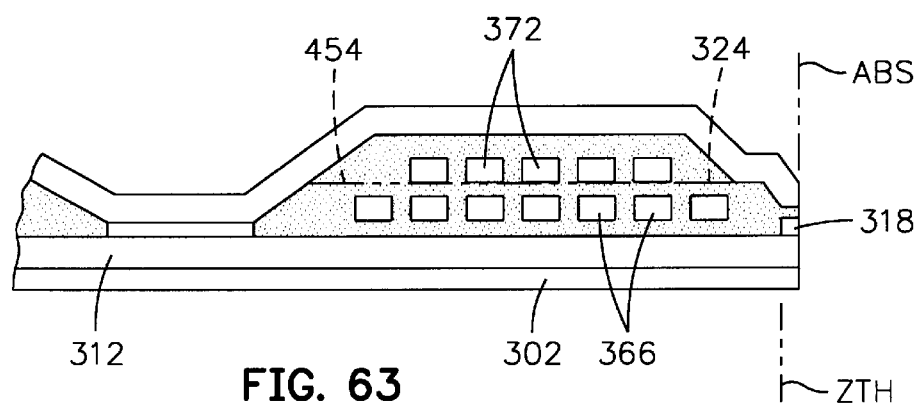
FIG. 63 is a longitudinal cross-sectional view of a second embodiment of the invention wherein a first coil is embedded in first and second insulation layers and the forming layer and the second coil layer is on top of the forming layer.
Figure 64:
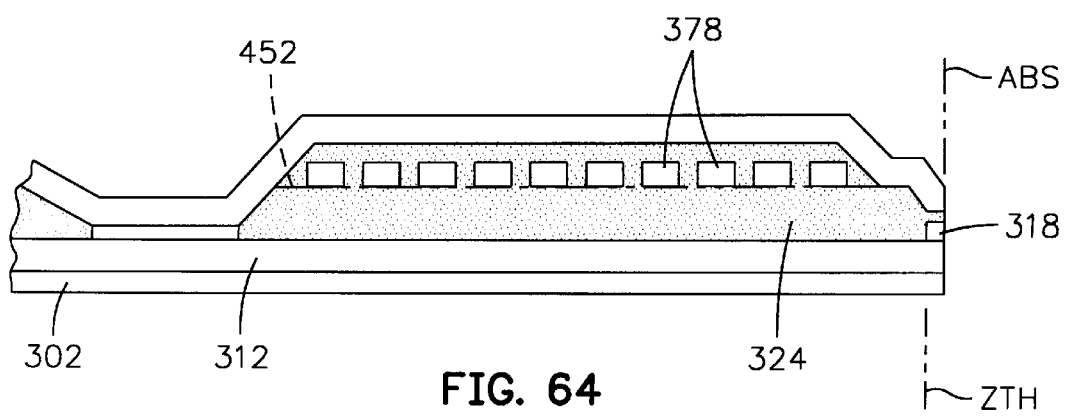
FIG. 64 is a third embodiment of the invention wherein a single coil is located on top of the forming layer.

For convenience, FIGS. 62–64 illustrate the various embodiments of coil arrangements in the present inverted merged MR head. In FIG. 62 a single coil 366 is shown embedded between first and second insulation layers and the forming layer 324, the forming layer being lapped at 448. In FIG. 63 first and second coils 366 and 372 are employed wherein the first coil 366 is embedded between first and second insulation layers and the forming layer and the second coil 372 is formed on top of a lapped surface 454 of the forming layer followed by second and third insulation layers. In FIG. 64 a single coil layer 378 is formed on top of the forming layer where it is lapped at 452. The embodiment shown in FIG. 64 is the preferred embodiment because of its ease of construction and high definition of the single coil 378 on an extremely flat surface 452.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

We claim:

1. A method of making a magnetic write head, comprising:

forming a first component of a first pole piece with a photoresist layer having an opening;

frame plating a second component of the first pole piece in the opening on the first component while leaving a remainder opening portion that exposes a top surface of the second component wherein the second component defines a track width of the write head;

soft baking the photoresist layer until the remainder opening portion has sloping side edges;

plating a sacrificial layer in the remainder opening portion on the top surface of the second component, wherein the sacrificial layer has a top surface;

removing the photoresist layer;

forming a forming layer adjacent the second component and the sacrificial layer, wherein the forming layer has a top surface;

lapping the top surfaces of the forming and sacrificial layers until they are flush;

removing the sacrificial layer while leaving the remainder opening portion;

forming a write gap layer in the remainder opening portion on the top surface of the second component; and plating a second pole piece layer in the remainder opening portion on top of the write gap layer.

2. A method as claimed in claim 1 further including:

the first component having a width W1 at an air bearing surface (ABS) plane;

the top surface of the second component being adjacent the write gap layer with a width W2 at the ABS plane;

the second pole piece having a bottom necked down portion and a top substantially rectangular portion that are contiguous with respect to one another at the ABS plane;

the necked down portion having a bottom and a top with widths W3 and W4 respectively and with side edges that diverge from the bottom to the top wherein the bottom is adjacent the write gap layer opposite the top surface of the second component and the rectangular portion having a top and a bottom with a width W4 between substantially vertical side edges that extend from its bottom to its top; and W2 and W3 being substantially equal.

3. A method as claimed in claim 2 wherein each of the widths W2–W4 are less than a maximum width of said opening.

4. A method as claimed in claim 2 wherein each of the sides edges and the bottom of the bottom necked down portion provide the bottom necked down portion with a bottom corner that has an inside angle that is greater than 90°; and each side edge of the bottom of the bottom necked down portion and a respective one of each of the vertical side edges of the rectangular portion providing the second pole piece with an intermediate corner that has an inside angle that is greater than 90°.

5. A method as claimed in claim 4 wherein each of said inside angles at the bottom corners is 110° to 150°.

6. A method as claimed in claim 4 including:

after forming the first component forming a first insulation layer on the first component, forming a first coil layer on the first insulation layer, forming a second insulation layer on the first coil layer;

forming the forming layer including forming the forming layer on the second insulation layer and the first coil layer; and forming a second coil layer on the forming layer.

7. A method as claimed in claim 4 further including:

after forming the first component forming a first insulation layer on the first component, forming a coil layer on the first insulation layer, forming a second insulation layer on the coil layer;

forming the forming layer including forming the forming layer on the second insulation layer and the coil layer; and the coil layer being the only coil layer in the magnetic head.

8. A method as claimed in claim 4 wherein:

frame plating also plates into further openings of the photoresist layer further second component portions on stud sites on the top surface of the first component leaving further remainder opening portions that expose further top surfaces of the further second component portions;

soft baking the photoresist layer also soft bakes the photoresist layer about the further second component portions;

plating the sacrificial layer also plates further sacrificial layer portions in the further remainder opening portions on the top surfaces or the further second component portions with top surfaces;

removing the photoresist layer also removes the photoresist layer that forms the further openings;

forming the forming layer also forms the forming layer about the further second component portions and the further sacrificial layers portions with a top surface;

lapping also laps the top surfaces of the forming layer and the further sacrificial layer portions; and removing the sacrificial layer does not remove the further sacrificial layer portions.

9. A method as claimed in claim 4 wherein:

frame plating also plates into another opening of the photoresist layer another second component portion of the first pole piece on a back gap portion of the first component leaving another remainder opening portion that exposes a top surface of the other second component portion at a back gap site;

soft baking the photoresist layer also soft bakes the photoresist layer about the other second component portion;

plating the sacrificial layer also plates another sacrificial layer portion in the other remainder opening portion on the top surface of the other second component portion with a top surface;

removing the photoresist layer also removes the photoresist layer forming the other opening; forming the forming layer also forms the forming layer adjacent the other second component portion and the other sacrificial layer portion with a top surface;

lapping laps the top surfaces of the forming layer and the sacrificial layer flush with respect to one another;

removing the sacrificial layer also removes the other sacrificial layer portion leaving the other remainder opening portion exposing the top surface of the other second component portion; and plating a second pole piece layer also plates a portion of the second pole piece layer in the other remainder opening portion on the top surface of the other second component portion.

10. The method of claim 9 wherein:

frame plating also plates into further openings of the photoresist layer further second component portions on stud sites on the top surface of the first component leaving further remainder opening portions that expose further top surfaces of the further second component portions;

soft baking the photoresist layer also soft bakes the photoresist layer about the further second component portions;

plating the sacrificial layer also plates further sacrificial layer portions in the further remainder opening portions on the top surfaces of the further second component portions with top surfaces;

removing the photoresist layer also removes the photoresist layer that forms the further openings;

forming the forming layer also forms the forming layer about the further second component portions and the further sacrificial layers portions with a top surface;

lapping also laps the top surfaces of the forming layer and the further sacrificial layer portions; and removing the sacrificial layer does not remove the further sacrificial layer portions.

11. The method of claim 4 wherein the width W4 is 1.5 W3 to 4.0 W3.

12. The method of claim 4 wherein the height of the bottom necked down portion from its bottom to its top is 1–3 $\mu$m and the width W4 of the rectangular portion between its substantially vertical side edges is 2–4 $\mu$m.

13. The method of claim 4 wherein said soft baking includes soft baking at a temperature in the range of 110° to 140° C.

14. The method of claim 4 further including:

immediately after forming the write gap layer, partially etching the write gap layer and depositing a seedlayer thereon prior to forming the second pole piece layer.

15. The method of claim 4 wherein the sacrificial layer is copper, the first and second components and the second pole piece layer are NiFe and the forming layer is alumina.

16. The method of claim 4 wherein removing the sacrificial layer includes an etchant that etches the sacrificial layer but does not etch the first and second components and the forming layer.

17. The method of claim 16 wherein the etchant is selected from the group $NH_4OH$ and $(NH_4)_3(SO_4)_2$.

18. The method of claim 4 wherein the widths W2 and W3 are submicron.

19. The method of claim 4 wherein forming the forming layer includes forming the forming layer at a lower level than the sacrificial layer in a field beyond the sacrificial layer.

20. The method of claim 4 further including:

after forming the forming layer, forming a coil layer on the forming layer.

21. The method of claim 20 wherein each of said inside angles at the bottom corners is 110° to 150°.

22. The method of claim 21 wherein:

frame plating also plates into another opening of the photoresist layer another second component portion of the first pole piece on a back gap portion of the first component leaving another remainder opening portion that exposes a top surface of the other second component portion at a back gap site;

soft baking the photoresist layer also soft bakes the photoresist layer about the other second component portion;

plating the sacrificial layer also plates another sacrificial layer portion in the other remainder opening portion on the top surface of the other second component portion with a top surface;

removing the photoresist layer also removes the photoresist layer forming the other opening;

forming the forming layer also forms the forming layer adjacent the other second component portion and the other sacrificial layer portion with a top surface;

lapping laps the top surfaces of the forming layer and the sacrificial layer flush with respect to one another;

removing the sacrificial layer also removes the other sacrificial layer portion leaving the other remainder opening portion exposing the top surface of the other second component portion; and plating a second pole piece layer also plates a portion of the second pole piece layer in the other remainder opening portion on the top surface of the other second component portion.

23. The method of claim 22 wherein:

frame plating also plates into further openings of the photoresist layer further second component portions on stud sites on the top surface of the first component leaving further remainder opening portions that expose further top surfaces of the further second component portions;

soft baking the photoresist layer also soft bakes the photoresist layer about the further second component portions;

plating the sacrificial layer also plates further sacrificial layer portions in the further remainder opening portions on the top surfaces of the further second component portions with top surfaces;

removing the photoresist layer also removes the photoresist layer that forms the further openings;

forming the forming layer also forms the forming layer about the further second component portions and the further sacrificial layers portions with a top surface;

lapping also laps the top surfaces of the forming layer and the further sacrificial layer portions; and removing the sacrificial layer does not remove the further sacrificial layer portions.

24. The method of claim 23 wherein the width W4 is 1.5 W3 to 4.0 W3.

25. The method of claim 24 wherein the height of the bottom necked down portion from its bottom to its top is 1–3 µm and the width W4 of the rectangular portion between its substantially vertical side edges is 2–4 µm.

26. The method of claim 25 wherein said soft baking includes hard baking at a temperature in the range of 115° to 130° C.

27. The method of claim 26 including:

immediately after forming the write gap layer partially etching the write gap layer and depositing a seedlayer thereon prior to forming the second pole piece layer.

28. The method of claim 27 wherein the sacrificial layer is copper, the first and second components and the second pole piece layer are NiFe and the forming layer is alumina.

29. The method of claim 28 wherein the step of removing the sacrificial layer includes an etchant that etches the sacrificial layer but does not etch the first and second components and the forming layer.

30. The method of claim 29 wherein the etchant is selected from the group $NH_4OH$ and $(NH_4)_3(SO_4)_2$.

31. The method of claim 30 wherein the widths W2 and W3 are submicron.

32. The method of claim 31 wherein forming the forming layer includes forming the forming layer at a lower level than the sacrificial layer in a field beyond the sacrificial layer.

33. A method of making a magnetic write head comprising:

forming a first pole piece with a first component having a top surface;

forming a photoresist layer on the top surface of the first component, the photoresist layer having a top surface and an opening that exposes a portion of the top surface of the first component;

plating a second component of the first pole piece in the opening on the exposed portion of the top surface of the first component leaving the photoresist layer with a remainder opening portion that exposes a top surface of the second component with the top surface of the second component being below the top surface of the photoresist layer;

soft baking the photoresist layer until the remainder opening portion has sloping side edges that diverge as they extend upwardly;

plating a sacrificial layer in the remainder opening portion of the photoresist layer on the exposed top surface of the second component with a top surface and sloping side edges that engage the sloping side edges of the remainder opening portion of the photoresist layer;

removing the photoresist layer exposing the side edges of the second component and the side edges of the sacrificial layer;

forming a forming layer on other portions of the top surface of the first component adjacent the side edges of the second component and the side edges of the sacrificial layer with a top surface;

lapping the top surfaces of the forming layer and the sacrificial layer until the top surfaces are substantially flush;

removing the sacrificial layer, while leaving the forming layer with the remainder opening portion exposing the top surface of the second component;

forming a write gap layer in the remainder opening portion of the forming layer with a bottom on the exposed top surface of the second component and with sloping side edges on the sloping side edges of the remainder opening portion of the forming layer; and forming a second pole piece layer in the remainder opening portion of the forming layer on the write gap layer with a bottom and sloping side edges.

34. The method of claim 33 including:

at an air bearing surface (ABS) plane, the first component having a width W1;

at the ABS plane, the top surface of the second component being adjacent the write gap layer with a width W2;

at the ABS plane, the second pole piece having a bottom necked down portion and a top substantially rectangular portion that are contiguous with respect to one another;

the necked down portion having a bottom and a top with widths W3 and W4 respectively and with side edges that diverge from the bottom to the top wherein the bottom is adjacent the write gap layer opposite the top surface of the second component and the rectangular portion having a top and a bottom with a width W4 between substantially vertical side edges that extend from its bottom to its top; and W2 and W3 being substantially equal.

35. The method of claim 34 wherein each of the widths W2–W4 are less than a maximum width of said opening.

36. The method of claim 34 wherein each of the sides edges and the bottom of the bottom necked down portion provide the bottom necked down portion with a bottom corner that has an inside angle that is greater than 90°; and each side edge of the bottom of the bottom necked down portion and a respective one of each of the vertical side edges of the rectangular portion providing the second pole piece with an intermediate corner that has an inside angle that is greater than 90°.

37. The method of claim 36 including:

after forming the forming layer forming a coil layer on the forming layer.

38. The method of claim 37 wherein each of said inside angles at the bottom corners is 110° to 150°.

39. The method of claim 38 wherein:

frame plating also plates into another opening of the photoresist layer another second component portion of the first pole piece on a back gap portion of the first component leaving another remainder opening portion that exposes a top surface of the other second component portion at a back gap site;

soft baking the photoresist layer also soft bakes the photoresist layer about the other second component portion;

plating the sacrificial layer also plates another sacrificial layer portion in the other remainder opening portion on the top surface of the other second component portion with a top surface;

removing the photoresist layer also removes the photoresist layer forming the other opening;

forming the forming layer also forms the forming layer adjacent the other second component portion and the other sacrificial layer portion with a top surface;

lapping laps the top surfaces of the forming layer and the sacrificial layer flush with respect to one another;

removing the sacrificial layer also removes the other sacrificial layer portion leaving the other remainder opening portion exposing the top surface of the other second component portion; and plating a second pole piece layer also plates a portion of the second pole piece layer in the other remainder opening portion on the top surface of the other second component portion.

40. The method of claim 39 wherein:

the step of frame plating also plates into further openings of the photoresist layer further second component portions on stud sites on the top surface of the first component leaving further remainder opening portions that expose further top surfaces of the further second component portions;

soft baking the photoresist layer also soft bakes the photoresist layer about the further second component portions;

plating the sacrificial layer also plates further sacrificial layer portions in the further remainder opening portions on the top surfaces of the further second component portions with top surfaces;

removing the photoresist layer also removes the photoresist layer that forms the further openings;

forming the forming layer also forms the forming layer about the further second component portions and the further sacrificial layers portions with a top surface;

lapping also laps the top surfaces of the forming layer and the further sacrificial layer portions; and removing the sacrificial layer does not remove the further sacrificial layer portions.

41. The method of claim 40 wherein the width W4 is 1.5 W3 to 4.0 W3.

42. The method of claim 41 wherein the height of the bottom necked down portion from its bottom to its top is 1–3 $\mu$m and the width W4 of the rectangular portion between its substantially vertical side edges is 2–4 $\mu$m.

43. The method of claim 42 wherein said soft baking is at a temperature in the range of 110° to 140° C.

44. The method of claim 43 including:

immediately after forming the write gap layer, partially etching the write gap layer and depositing a seedlayer thereon prior to forming the second pole piece layer.

45. The method of claim 44 wherein the sacrificial layer is copper, the first and second components and the second pole piece layer are NiFe and the forming layer is alumina.

46. The method of claim 45 wherein the step of removing the sacrificial layer includes an etchant that etches the sacrificial layer but does not etch the first and second components and the forming layer.

47. The method of claim 46 wherein the etchant is selected from the group $NH_4OH$ and $(NH_4)_3(SO_4)_2$.

48. The method of claim 47 wherein the widths W2 and W3 are submicron.

49. The method of claim 48 wherein forming the forming layer includes forming the forming layer at a lower level than the sacrificial layer in a field beyond the sacrificial layer.

50. A method of making a combined magnetic write and read head comprising:

forming a first shield layer;

forming a first gap layer on the first shield layer;

forming a sensor layer and first and second lead layers on the first gap layer with the first and second lead layers connected to the sensor layer;

forming a second gap layer on the sensor layer and the first and second lead layers;

forming a first pole piece with a first component on the second gap layer wherein the first component has a top surface;

forming a photoresist layer on the top surface of the first component with a top surface and an opening that exposes a portion of the top surface of the first component;

plating a second component of the first pole piece in the opening on the exposed portion of the top surface of the first component leaving the photoresist layer with a remainder opening portion that exposes a top surface of the second component with the top surface of the second component being below the top surface of the photoresist layer;

soft baking the photoresist layer until the remainder opening portion has sloping side edges that diverge as they extend upwardly;

plating a sacrificial layer in the remainder opening portion of the photoresist layer on the exposed top surface of the second component with a top surface and sloping side edges that engage the sloping side edges of the remainder opening portion of the photoresist layer;

removing the photoresist layer exposing the side edges of the second component and the side edges of the sacrificial layer;

forming a forming layer on other portions of the top surface of the first component adjacent the side edges of the second component and the side edges of the sacrificial layer with a top surface;

lapping the top surfaces of the forming layer and the sacrificial layer until the top surfaces are substantially flush with respect to one another;

removing the sacrificial layer leaving the forming layer with the remainder opening portion exposing the top surface of the second component;

forming a write gap layer in the remainder opening portion of the forming layer with a bottom on the exposed top surface of the second component and with sloping side edges on the sloping side edges of the remainder opening portion of the forming layer; and forming a second pole piece layer in the remainder opening portion of the forming layer on the write gap layer with a bottom and sloping side edges.

51. The method of claim 50 including:

at an air bearing surface (ABS) plane, the first component having a width W1;

at the ABS plane, the top surface of the second component being adjacent the gap layer with a width W2;

at the ABS plane, the second pole piece having a bottom necked down portion and a top substantially rectangular portion that are contiguous with respect to one another;

the necked down portion having a bottom and a top with widths W3 and W4 respectively and with side edges that diverge from the bottom to the top wherein the bottom is adjacent the gap layer opposite the top surface of the second component and the rectangular portion having a top and a bottom with a width W4 between substantially vertical side edges that extend from its bottom to its top; and W2 and W3 being substantially equal.

52. The method of claim 51 wherein each of the widths W2–W4 are less than a maximum width of said opening.

53. The method of claim 51 wherein each of the sides edges and the bottom of the bottom necked down portion provide the bottom necked down portion with a bottom corner that has an inside angle that is greater than 90°; and each side edge of the bottom of the bottom necked down portion and a respective one of each of the vertical side edges of the rectangular portion providing the second pole piece with an intermediate corner that has an inside angle that is greater than 90°.

54. The method of claim 53 including:

after forming the forming layer forming a coil layer on the forming layer.

55. The method of claim 54 wherein each of said inside angles at the bottom corners is 110° to 150°.

56. The method of claim 55 wherein:

frame plating also plates into another opening of the photoresist layer another second component portion of the first pole piece on a back gap portion of the first component leaving another remainder opening portion that exposes a top surface of the other second component portion at a back gap site;

soft baking the photoresist layer also soft bakes the photoresist layer about the other second component portion;

plating the sacrificial layer also plates another sacrificial layer portion in the other remainder opening portion on the top surface of the other second component portion with a top surface;

removing the photoresist layer also removes the photoresist layer forming the other opening;

forming the forming layer also forms the forming layer adjacent the other second component portion and the other sacrificial layer portion with a top surface;

lapping laps the top surfaces of the forming layer and the sacrificial layer flush with respect to one another;

removing the sacrificial layer also removes the other sacrificial layer portion leaving the other remainder opening portion exposing the top surface of the other second component portion; and plating a second pole piece layer also plates a portion of the second pole piece layer in the other remainder opening portion on the top surface of the other second component portion.

57. The method of claim 56 wherein:

frame plating also plates into further openings of the photoresist layer further second component portions on stud sites on the top surface of the first component leaving further remainder opening portions that expose further top surfaces of the further second component portions;

soft baking the photoresist layer also soft bakes the photoresist layer about the further second component portions;

plating the sacrificial layer also plates further sacrificial layer portions in the further remainder opening portions on the top surfaces of the further second component portions with top surfaces;

removing the photoresist layer also removes the photoresist layer that forms the further openings;

forming the forming layer also forms the forming layer about the further second component portions and the further sacrificial layers portions with a top surface;

lapping also laps the top surfaces of the forming layer and the further sacrificial layer portions; and removing the sacrificial layer does not remove the further sacrificial layer portions.

58. The method of claim 57 wherein the width W4 is 1.5 W3 to 4.0 W3.

59. The method of claim 58 wherein the height of the bottom necked down portion from its bottom to its top is 1–3 μm and the width W4 of the rectangular portion between its substantially vertical side edges is 2–4 μm.

60. The method of claim 59 wherein said soft baking is at a temperature in the range of 110° to 140° C.

* * * * *